US012652380B2

(12) United States Patent
George et al.

(10) Patent No.: US 12,652,380 B2
(45) Date of Patent: Jun. 9, 2026

(54) CONCEPT FOR ENHANCING PARALLEL CODING CAPABILITIES

(71) Applicant: Fraunhofer-Gesellschaft zur Förderung der angewandten Forschung e.V., Munich (DE)

(72) Inventors: Valeri George, Berlin (DE); Tobia Hinz, Berlin (DE); Jackie Ma, Berlin (DE); Jens Brandenburg, Berlin (DE); Christian Lehmann, Berlin (DE); Adam Wieckowski, Berlin (DE); Heiko Schwarz, Berlin (DE); Detlev Marpe, Berlin (DE); Thomas Wiegand, Berlin (DE); Thomas Schierl, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 173 days.

(21) Appl. No.: 18/477,292

(22) Filed: Sep. 28, 2023

(65) Prior Publication Data

US 2024/0048688 A1     Feb. 8, 2024

Related U.S. Application Data

(60) Division of application No. 17/035,061, filed on Sep. 28, 2020, now Pat. No. 11,805,241, which is a (Continued)

(30) Foreign Application Priority Data

Mar. 29, 2018     (EP) .................................... 18165206

(51) Int. Cl.
H04N 19/105 (2014.01)
H04N 19/117 (2014.01)
(Continued)

(52) U.S. Cl.
CPC ......... H04N 19/105 (2014.11); H04N 19/117 (2014.11); H04N 19/159 (2014.11); H04N 19/176 (2014.11); H04N 19/82 (2014.11)

(58) Field of Classification Search
CPC .. H04N 19/105; H04N 19/117; H04N 19/159; H04N 19/176; H04N 19/82;
(Continued)

(56) References Cited

U.S. PATENT DOCUMENTS 9,544,603 B2     1/2017  Lee
9,596,469 B2     3/2017  George
(Continued)

FOREIGN PATENT DOCUMENTS

CN     103797793 A     5/2014
JP     2013123206 A     6/2013
(Continued)

OTHER PUBLICATIONS

ISO IEC ITU-T H.265 High efficiency video coding 2014, 2014.
(Continued)

*Primary Examiner* — Joseph W Becker
(74) *Attorney, Agent, or Firm* — Conley Rose, P.C.

(57) ABSTRACT

A video encoder is disclosed that is configured to encode a slice of a current picture into a data stream by partitioning the slice into rows of Coding Tree Units (CTUs), select a CTU dependency offset for the slice out of a plurality of CTU dependency offsets, the CTU dependency offset indicating a minimum CTU offset between consecutive CTU rows to be obeyed by a decoder when decoding CTU rows in parallel, and signal the CTU dependency offset in the data stream. The CTU dependency offset is selected based on a slice type of the slice.

20 Claims, 16 Drawing Sheets

Related U.S. Application Data continuation of application No. PCT/EP2019/057900, filed on Mar. 28, 2019.

(51) Int. Cl.
| | |
|---|---|
| *H04N 19/159* | (2014.01) |
| *H04N 19/176* | (2014.01) |
| *H04N 19/82* | (2014.01) |

(58) Field of Classification Search
CPC .... H04N 19/91; H04N 19/463; H04N 19/436; H04N 19/31; H04N 19/13; H04N 19/172; H04N 19/70; H04N 19/119
See application file for complete search history.

(56) References Cited

U.S. PATENT DOCUMENTS

| | | | | |
|---|---|---|---|---|
| 9,693,061 | B2 | 6/2017 | Lee | |
| 10,110,897 | B2 | 10/2018 | Okawa | |
| 10,313,699 | B2 | 6/2019 | Chun | |
| 2015/0016540 | A1* | 1/2015 | Rapaka | H04N 19/33 |
| | | | | 375/240.24 |
| 2015/0334425 | A1 | 11/2015 | He | |
| 2016/0105682 | A1 | 4/2016 | Rapaka | |
| 2016/0353112 | A1 | 12/2016 | Zhang | |
| 2017/0094271 | A1 | 3/2017 | Liu | |
| 2018/0020222 | A1 | 1/2018 | Wu | |
| 2018/0084284 | A1* | 3/2018 | Rosewarne | H04N 19/124 |
| 2020/0068200 | A1 | 2/2020 | Galpin | |
| 2021/0329235 | A1 | 10/2021 | Okawa | |

FOREIGN PATENT DOCUMENTS

| | | | |
|---|---|---|---|
| JP | 2015508627 | A | 3/2015 |
| KR | 20130088087 | A | 8/2013 |
| KR | 20140098775 | A | 8/2014 |
| KR | 101676788 | B1 | 4/2016 |
| KR | 20160045503 | A | 4/2016 |
| WO | 2010129883 | A1 | 11/2010 |
| WO | 2016060405 | A1 | 4/2016 |
| WO | 2016137368 | A1 | 9/2016 |
| WO | WO 2018/174593 | A1 * | 9/2018 |

OTHER PUBLICATIONS

J. Chen, E. Alshina, G. J_ Sullivan, J.-R. Ohm, J_ Boyce. Algorithm description of Joint Exploration Test Model 7 (JEM7), JVET, doc. JVET-G1001., Aug. 2017.

Zhang, Li; JVET-E0104, "Alf temporal prediction with temporal scalability", Joint Video Exploration Team (JVET) of ITU-T SG 16 WP 3 and ISO/IEC JTC 1/SC 29/WG 11, 5th Meeting: Geneva, CH., Jan. 2017.

Zhang, Li et al; JVET-E0104_r1, "ALF temporal prediction with temporal scalability", Joint Video Exploration Team (JVET) of ITU-T SG 16 WP 3 and ISO/IEC JTC 1/SC 29/WG 11., Jan. 2017.

Zhang, Li et al; JVET-E0104, "ALF temporal prediction with temporal scalability" Qualcomm powerpoint., not available.

Chen, Jianle, et al; JVET-A1001 "Algorithm Description of Joint Exploration Test Model 1", Joint Video Exploration Team (JVET); of ITU-T SG 16 WP 3 and ISO/IECJTC 1/SC 29/WG 11, 1nd Meeting: Geneva, CH, Oct. 2015.

JEM reference software—TComAdaptiveLoopFilter, Oct. 29, 2020.

JEM reference software—TComAdaptiveLoopFilter_h, Oct. 29, 2020.

JEM reference software—TEncAdaptiveLoopFilter, Oct. 29, 2020.

JEM reference software—TEncAdaptiveLoopFilter_h, Oct. 29, 2020.

JEM reference software—TEncSlice, Oct. 29, 2020.

Ma, Xiang, et al.; "CE3-related: Classification-based Mean Value for CCLM Coefficients Derivation"; JVET-L0342-r2; Oct. 3-12, 2018; 7 pages.

* cited by examiner

| ... | ... |
|---|---|
| bit_depth_luma_minus8 | ue(v) |
| bit_depth_chroma_minus8 | ue(v) |
| log2_max_pic_order_cnt_lsb_minus4 | ue(v) |
| cabac_temporal_init_mode | ue(v) |
| ... | ... |

Fig. 9

| ... | ... |
|---|---|
| bit_depth_luma_minus8 | ue(v) |
| bit_depth_chroma_minus8 | ue(v) |
| cabac_temporal_init_mode | ue(v) |
| alf_enabled_flag | u(1) |
| alf_temporal_init_restriction | u(1) |
| log2_max_pic_order_cnt_lsb_minus4 | ue(v) |
| ... | ... |

Fig. 11

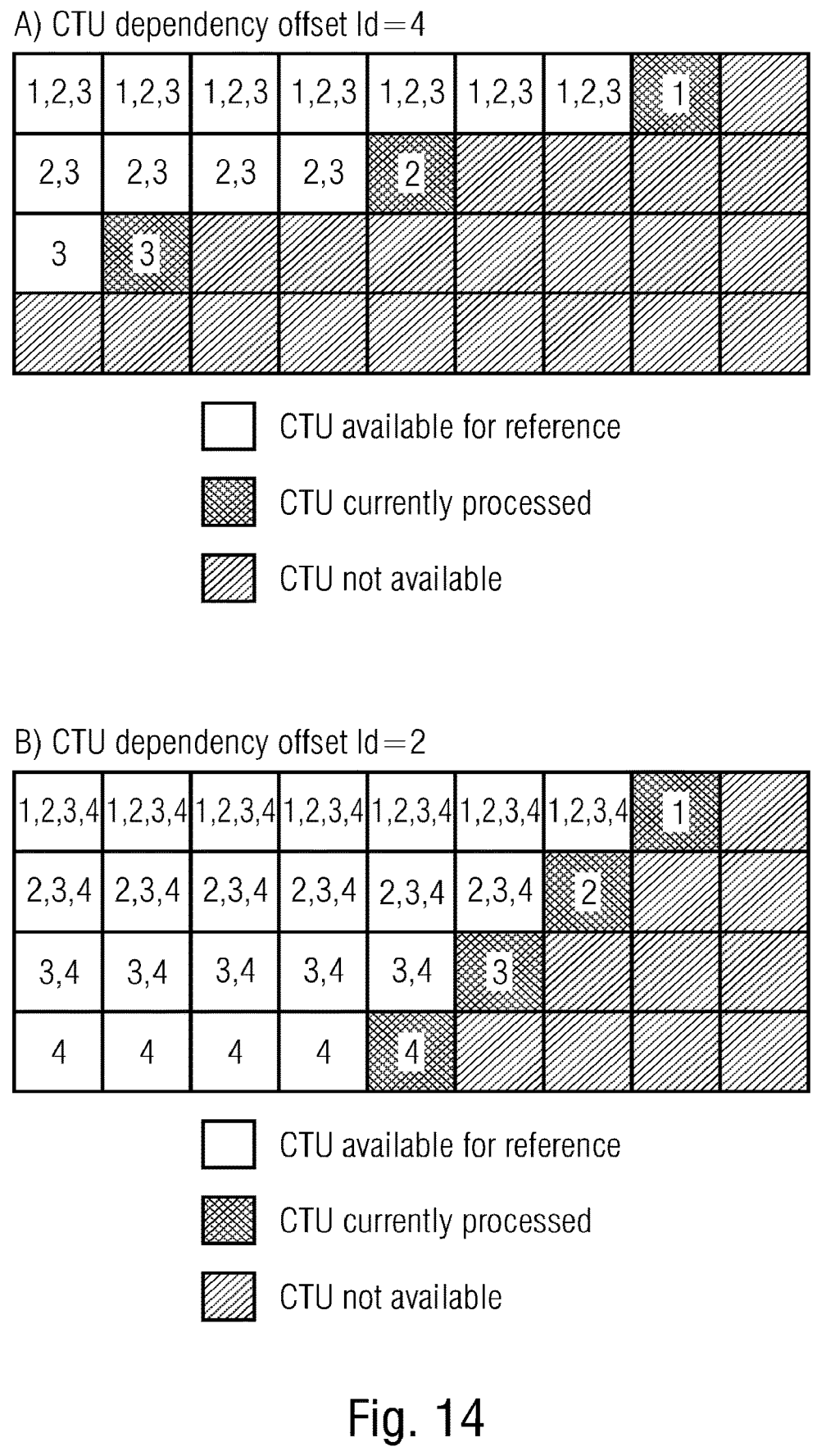

A) CTU dependency offset Id = 4

| 1,2,3 | 1,2,3 | 1,2,3 | 1,2,3 | 1,2,3 | 1,2,3 | 1,2,3 | 1 | |
| 2,3 | 2,3 | 2,3 | 2,3 | 2 | | | | |
| 3 | 3 | | | | | | | |
| | | | | | | | | |

☐ CTU available for reference

▨ CTU currently processed

▨ CTU not available

B) CTU dependency offset Id = 2

| 1,2,3,4 | 1,2,3,4 | 1,2,3,4 | 1,2,3,4 | 1,2,3,4 | 1,2,3,4 | 1,2,3,4 | 1 | |
| 2,3,4 | 2,3,4 | 2,3,4 | 2,3,4 | 2,3,4 | 2,3,4 | 2 | | |
| 3,4 | 3,4 | 3,4 | 3,4 | 3,4 | 3 | | | |
| 4 | 4 | 4 | 4 | 4 | | | | |

☐ CTU available for reference

▨ CTU currently processed

▨ CTU not available

Fig. 14

| ... | ... |
|---|---|
| log2_diff_max_min_luma_transform_block_size | ue(v) |
| CTU_dependency_offset_inter_id | ue(v) |
| CTU_dependency_offset_intra_id | ue(v) |
| max_transform_ierarchy_depth_inter | ue(v) |
| ... | ... |

Fig. 15

CONCEPT FOR ENHANCING PARALLEL CODING CAPABILITIES

CROSS-REFERENCES FOR RELATED APPLICATIONS

This application is a divisional of U.S. application Ser. No. 17/035,061, filed on Sep. 28, 2020, which is a continuation of International Application No. PCT/EP2019/057900, filed Mar. 28, 2019, and additionally claims priority from European Application No. EP 18165206.6, filed Mar. 29, 2018, each of which is incorporated herein by reference in its entirety.

The present application is concerned with video coding concepts which enable improved suitability of the respective codec for parallel processing at encoder and/or decoder.

BACKGROUND OF THE INVENTION

H.265/HEVC is video codec which already provides tools for elevating or even enabling parallel processing at encoder and/or decoder. For instance, HEVC supports a sub-division of pictures into an array of tiles which are encoded independently from each other. Another concept supported by HEVC pertains to WPP, according to which CTU rows or CTU-lines of the pictures may be processed in parallel from left to right, i.e. in stripes, provided that some minimum CTU offset is obeyed in the processing of consecutive CTU lines. It would be favorable, however, to have a video codec at hand which supports parallel processing capabilities of video encoders and/or video decoders even more efficiently.

SUMMARY

According to an embodiment, a video encoder may be configured to encode, by block based encoding, pictures of a video into coding data the coding data including quantization information associating with each of blocks of the pictures a quantization parameter, encode the coding data into the data stream with encoding, for a predetermined block of a current picture, the quantization parameter associated with the predetermined block into the data stream using spatial prediction and in a manner independent from quantization parameters of blocks outside a spatial neighborhood which covers neighbor blocks of the picture immediately adjacent to the predetermined block.

According to another embodiment, a video decoder may be configured to decode coding data from the data stream, the coding data including, by block based encoding, pictures of a video encoded thereinto and including quantization information associating, for each of blocks of the pictures, a quantization parameter, decoding, for a predetermined block of the current picture, the quantization parameter associated with the predetermined block from the data stream using spatial prediction and in a manner independent from quantization parameters of blocks outside a spatial neighborhood which covers neighbor blocks of the picture immediately adjacent to the predetermined block.

According to another embodiment, a video encoder may be configured to encode, by block based encoding, pictures of a video into a data stream using spatial intra-picture coding dependency, wherein the video encoder is configured to signal a selected spatial intra-picture coding reach setting out of a plurality of spatial intra-picture coding reach settings in the data stream, wherein a spatial reach of the spatial intra-picture dependency with respect to currently coded blocks of a current picture of the video corresponds to the selected spatial intra-picture coding reach setting.

According to another embodiment, a video decoder may be configured to decode, by block based decoding, pictures of a video from a data stream using spatial intra-picture coding dependency, wherein the video decoder is configured to derive a selected spatial intra-picture coding reach setting out of a plurality of spatial intra-picture coding reach settings from the data stream, wherein a spatial reach of the spatial intra-picture dependency with respect to currently coded blocks of a current picture of the video corresponds to the selected spatial intra-picture coding reach setting.

According to another embodiment, a video encoding method may have the steps of: encoding, by block based encoding, pictures of a video into coding data the coding data including quantization information associating with each of blocks of the pictures a quantization parameter, encoding the coding data into the data stream with encoding, for a predetermined block of a current picture, the quantization parameter associated with the predetermined block into the data stream using spatial prediction and in a manner independent from quantization parameters of blocks outside a spatial neighborhood which covers neighbor blocks of the picture immediately adjacent to the predetermined block.

According to another embodiment, a video decoding method may have the steps of: decoding coding data from the data stream, the coding data including, by block based encoding, pictures of a video encoded thereinto and including quantization information associating, for each of blocks of the pictures, a quantization parameter, decoding, for a predetermined block of the current picture, the quantization parameter associated with the predetermined block from the data stream using spatial prediction and in a manner independent from quantization parameters of blocks outside a spatial neighborhood which covers neighbor blocks of the picture immediately adjacent to the predetermined block.

According to another embodiment, a video encoding method may have the steps of: encoding, by block based encoding, pictures of a video into a data stream using spatial intra-picture coding dependency, wherein the video encoder is configured to signal a selected spatial intra-picture coding reach setting out of a plurality of spatial intra-picture coding reach settings in the data stream, wherein a spatial reach of the spatial intra-picture dependency with respect to currently coded blocks of a current picture of the video corresponds to the selected spatial intra-picture coding reach setting.

According to another embodiment, a video decoding method may have the steps of: decoding, by block based decoding, pictures of a video from a data stream using spatial intra-picture coding dependency, wherein the video decoder is configured to derive a selected spatial intra-picture coding reach setting out of a plurality of spatial intra-picture coding reach settings from the data stream, wherein a spatial reach of the spatial intra-picture dependency with respect to currently coded blocks of a current picture of the video corresponds to the selected spatial intra-picture coding reach setting.

In accordance with a first aspect of the present application, a video codec is rendered more efficient in terms of supporting parallel encoding/decoding capabilities by performing context entropy probability management in a picture stripe-aware manner. That is, starting point of the first aspect is a video codec where pictures are coded into coding data using block-based encoding and where the coding data is entropy encoded into a data stream using context-adaptive entropy coding along stripes which partition the pictures and cross the pictures in a mutually parallel manner, such as CTU lines, for instance, with initializing context entropy probabilities at starting points of the stripes, such as at the pictures' left-hand side border, and adapting the context entropy probabilities alongside the stripes. The coding of the video's pictures into the coding data as well as the entropy encoding of the coding data into the data stream may be designed in a manner so that they allow for WPP processing at encoder and decoder, i.e., for encoding and decoding, namely in that spatial intra-picture coding dependencies define reaches around currently processed portions of the stripes of a certain picture so that for any stripe, the spatial intra-picture coding dependency reach for its currently processed portion of the respective stripe merely covers already processed portions behind the wave front of currently processed portions of the other stripes of the respective picture. According to the first aspect, parallelity is rendered more efficient by buffering the context entropy probabilities resulting from adaptation of the context entropy probabilities as initialized at the starting point up to a buffering point of the respective stripe for each stripe and looking-up, in initializing the context entropy probabilities, for each stripe of a current picture, a state which is buffered for a stripe of a previous picture which is co-located to the respective stripe. The look-up is done using an information on a location of the respective stripe within the current picture, such as by using the information as an index or portion of an index of the look-up. That is, buffering and looking-up of context entropy probabilities for initializing the stripes is done in a manner stripe-aware or, differently speaking, for each strip position within the pictures of the video separately. By this measure, the context entropy probabilities which are inherited from one picture to another for initializing the other picture's context entropy probabilities of the various stripes of this other picture, have been adapted on the basis of picture content which is adapted to the recipient of the inherited probabilities, i.e. the collocated stripe in the current picture. Owing to having been adapted on the basis of co-located picture content, these probabilities should be closely adapted to the actual entropy probabilities of the current picture at the respective stripes. Thus, in accordance with the first aspect of the present application, parallel processing is rendered more efficient by inheriting context entropy probabilities from stripes of one picture to co-located stripes of another picture in a stripe-aware manner or, differently speaking, in a manner performing the inheritance separately for co-located stripes so that the coding efficiency is improved owing to a more close adaptation of the inherited context entropy probabilities. This coding efficiency increase, in turn, comes at a relatively low processing overhead increase associated with a stripe separate buffering, i.e. in a FIFO manner replacing older probabilities stemming from collocated stripe(s), and initialization of the context entropy probabilities, i.e. applying probabilities of collocated stripes of previous picture(s). Concretely, an increased buffer amount for buffering the context entropy probabilities is needed and the information of a stripe location such as in form of a stripe index is to be taken into account in buffering and/or look-up such as in form of using this information as an entry of an index for looking-up the context entropy probabilities for a current stripe of a current picture only.

A second aspect of the present application also pertains context entropy probability initialization. The second aspect, however, considers temporal interdependency. According to the second aspect, pictures of the video are coded into the coding data in a manner defining hierarchical temporal coding interdependencies between the pictures according to which the pictures are classified into different temporal levels. For each temporal level, pictures of the respective temporal level are encoded independent from pictures of temporal levels higher than the respective temporal level, and for each non-zero temporal level, pictures of the respective non-zero temporal level are encoded mutually independent. For instance, closed or open GOP structures may be used. In order to avoid initializing the context entropy probabilities for each picture anew, the coding data is coded in the data stream in a manner so that, for each picture, the context entropy probabilities are initialized at least one starting point within the respective picture. The context entropy probabilities are adapted alongside a coding path traversing the respective picture from the at least one starting point onwards. In accordance with the second aspect of the present application, the context entropy probability management for inheriting context entropy probabilities from one picture to another is done in a manner which is aware of the membership to certain temporal levels. For instance, for each of at least a subset of the pictures, a state of the context entropy probabilities resulting from the adaptation of the context entropy probabilities alongside the coding path up to at least one buffering point of the respective picture, is buffered and then, in initializing the context entropy probabilities, for each of the at least one starting point within a current picture, an index is determined using an information on a temporal level of the current picture and this index is then used to look up a state which is buffered for a previously encoded/decoded picture of a temporal level lower than the current picture's temporal level. That is, the look-up of buffered context entropy probabilities for a certain picture is done in a manner so that the temporal level ranking is obeyed and does not introduce temporal interdependencies between pictures of the same temporal level. By this measure, it is possible to schedule the coding/decoding of pictures of a certain temporal level such as the highest temporal level in a manner so that same are processed in parallel with nevertheless taking advantage of previously buffered learned/adapted context entropy probabilities, thereby achieving improved coding efficiency and, concurrently, improved suitability with respect to parallel processing capabilities.

Another aspect of the present application pertains to filter parameterization. In particular, the third aspect of the present application pertains a video codec where filter parameterizations settings for in-loop or post filter such as an adaptive loop filter are buffered during processing, i.e., encoding and decoding, so as to form a sort of pool or reservoir of most recently applied filter parameterization settings into which an index may be signaled in the data stream for some current picture in order to derive the filter parameterization setting of the in-loop or post filter for this current picture instead of having to transmit the setting anew or anew completely. Like in the second aspect, the pictures of the video are assumed to be coded in the data stream in a manner defining hierarchical temporal coding interdependencies between the pictures according to which the pictures are classified into different temporal levels wherein, for each temporal level, pictures of the respective temporal level are encoded independent from pictures of the temporal levels higher than the respective temporal level, and for each non-zero temporal level, pictures of the respective non-zero temporal level are encoded mutually independently. The coding takes place using the aforementioned in-loop or post filter. For each of at least a subset of the pictures, a filter parameterization setting of the in-loop or post filter applied for the respective picture is buffered. For instance, the buffering takes place for those pictures for which the filter parameterization setting is signaled in the data stream explicitly, i.e., without indexing, for instance. For a current picture for which, for instance, the filter parameterization setting is not explicitly signaled in the data stream, however, the filter parameterization setting of the in-loop or post filter involves the signaling of an index in the data stream and in accordance with the third aspect of the present application, this index indexes one out of a subset of the states buffered which subset excludes states buffered for pictures of a temporal level higher than, or equal to, the current picture's temporal level. That is, the indexing of filter parameterization settings which is used to lower the side information overhead associated with the filter parameterization settings is done in a manner so that the hierarchical temporal coding interdependencies between the pictures is also obeyed with respect to the filter parameterization setting signaling. The buffering of filter parameterization settings is done in a manner aware of the respective temporal level of the picture from which the filter parameterization setting to be buffered stems as well as the temporal level of the current picture for which the filter parametrization setting is to be determined, and the encoder obeys the restriction of the indexing so as to merely index buffered filter parameterization settings for the current picture which stem from previously processed pictures of lower temporal level. By this measure, parallel processing of pictures of a certain non-zero temporal level such as the pictures of the highest temporal level is enabled at a comparatively minor restriction in the usage of buffered filter parameterization settings with respect to its use as a reservoir for keeping the filter parameterization setting side information overhead low. The encoder and decoder may take the membership of the various temporal levels into account when buffering the states of previous pictures such as in order to buffer, in a FIFO manner, one or more most recent settings relevant for the various temporal levels.

The further aspect of the present application pertains to video codecs which make use of a block-wise varying quantization parameter associated with blocks of the respective picture. Possibly, an in-loop or post filter such as a deblocking filter parameterized is involved in coding, which is set according to the quantization parameter. The coding of the coding data in the data stream, however, is done in a manner so that for a predetermined block of the current picture, the quantization parameter associated with a predetermined block is coded in the data stream using spatial prediction and in a manner independent from quantization parameters of blocks outside a spatial neighborhood which covers neighbor blocks of the picture immediately adjacent to the predetermined block. That is, according to the fourth aspect of the present application, it is avoided that the quantization parameter associated with the predetermined block depends on quantization parameters of blocks farther away from the predetermined block such as, for instance, in a previous stripe of the current picture. By obeying some coding offset between consecutive stripes in stripe coding order, an encoder is, thus, able to perform the coding of these stripes in parallel: the encoder sets the quantization parameter in accordance with certain techniques such as, for instance, using some rate control and/or according to some rate/distortion optimization, and is able to use the thus set quantization parameters instantaneously for tasks such as the quantization of a prediction residual, but possibly also for further tasks such as for using the quantization parameter to set for an in-loop or post filter a filter parameterization setting which depends on this quantization parameter. Any waiting for the completion of processing of the previous stripe is not needed. The overall coding latency is, thus, reduced. Should any block on which the spatial prediction of the quantization parameter for a predetermined block of a current picture depends, be not available due to, for instance, same being located outside the current slice which the predetermined block belongs to, or even outside the picture, as a substitute a slice quantization parameter may be used, namely the one transmitted for the current slice.

A fifth aspect of the present application relates to a video codec which is adaptable with respect to its spatial coding dependency reach. That is, the video codec uses spatial intra-picture coding dependency in coding pictures of the video into the data stream, but the codec allows for signaling a selected spatial coding dependency reach of a plurality of coding dependency reach settings in the data stream. The spatial reach of the spatial intra-picture coding dependency with respect to a current block of a current picture of the video is set depending on the selected spatial coding dependency reach setting. For instance, this applies to predicting for the current block the picture content thereof such as for any intra-predicted block, or applies to predicting any coding parameter for the current block, or applies to deriving any context entropy probability for coding any coding parameter relating to the current block or all of these possibilities. Rendering a video codec adaptable with respect to the spatial coding dependency reach renders the video codec adaptable with respect to the degree of parallelism in coding/decoding the pictures of the video such as with respect to inter-slice coding offset or coding wave front tilt on the one hand and the coding efficiency in terms of compression efficiency in view of a larger or smaller spatial coding dependency reach on the other hand. That is, the fifth aspect of the present application enables weighing-up between higher parallelism at the cost of small reduction in coding compression efficiency owing to a reduced spatial coding dependency reach. In accordance with an embodiment, the signaling is done using a spatial minimum inter-stripe decoding offset.

A sixth aspect of the present application relates to a video codec which uses a spatial coding dependency reach differently set for purely intra-predicted portions of the video compared to inter-predicted portions of the video. Rendering a video codec sensitive to available coding modes with respect to the spatial coding dependency reach renders the video codec adaptable with respect to the degree of parallelism in coding/decoding the pictures of the video such as with respect to inter-slice coding offset or coding wave front tilt on the one hand and the coding efficiency in terms of compression efficiency in view of a larger or smaller spatial coding dependency reach on the other hand. Here, it is taken into account compared to the fifth aspect that the worthiness to increase coding efficiency in favor of parallelism is increased for purely intra coded portions of a video compared to inter-predictively coded portions as the latter are less restricted as far as the sources for coding inter dependencies are concerned.

With respect to the aforementioned aspect of the present application, it is noted that same may be combined so that more than one of the aforementioned aspects such as all aspects are implemented in a video codec concurrently.

BRIEF DESCRIPTION OF THE DRAWINGS

Embodiments of the present invention will be detailed subsequently referring to the appended drawings, in which:

FIG. 9 shows an example for a portion of a parameter set, here exemplarily an SPS, enabling a variation of a mode of context entropy probability inheritance in temporal dimension;

FIG. 11 shows an example for a syntax of a parameter set, here exemplarily an SPS, signaling the restriction associated with the temporal level awareness discussed with respect to FIG. 12 to the decoder;

FIG. 14 shows currently processed portions offset relative to each other at a different inter-stripe offset owing to a different sized spatial intra-picture coding dependency reach in order to illustrate the impact of the reach setting onto the parallelity capability;

FIG. 15 shows an example for a syntax portion of a parameter set, here exemplarily an SPS, illustrating a separate signaling of the reach setting for I slices compared to other slices also offering inter-prediction modes.

DETAILED DESCRIPTION OF THE INVENTION

The following description of embodiments of the present application for the various aspects briefly discussed above, which embodiments may form novel techniques for, or build into, a next generation video coding system following the state-of-art video coding standard ITU T H.265|MPEG H HEVC [1], the following description starts with a brief introduction of some relevant coding tools available in state-of-art video coding standard ITU T H.265|MPEG H HEVC [1] or in the JEM-Software [3].

Figure 1:
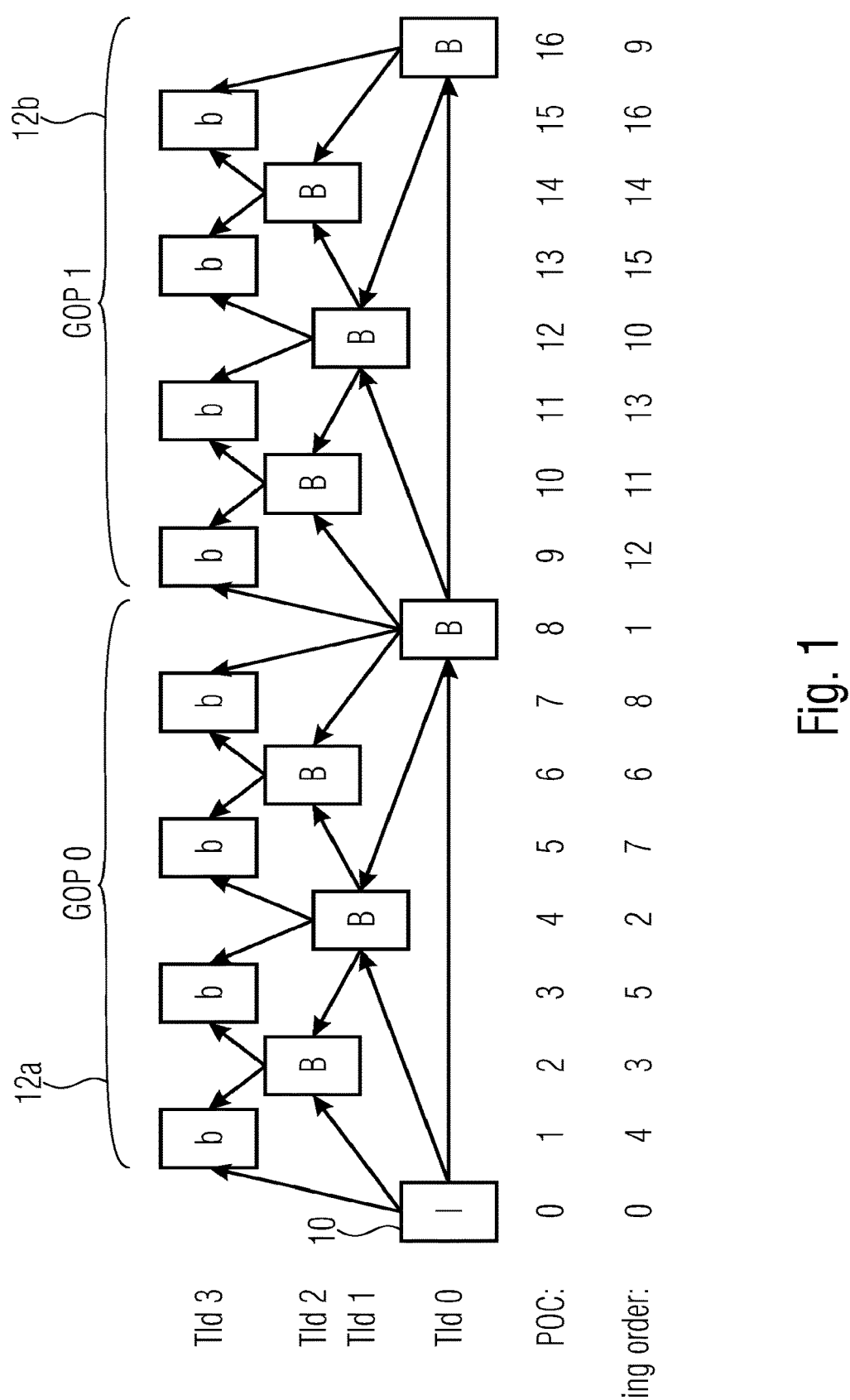
FIG. 1 shows a schematic diagram illustrating pictures of two groups of pictures (GOP), the figure illustrating the temporal signal prediction flow by use of arrows, wherein the pictures are arranged horizontally from left to right along the temporal presentation order following the picture order count (POC) and spread vertically in one of four levels corresponding to hierarchical temporal levels.

Considering temporal dependencies, one of the commonly used configurations in video coding is a "random access" coding mode, where hierarchical picture formation is packed into a group of pictures (GOP), FIG. 1 shows an example. The structural delay, caused by some dependencies between pictures 10, allows picture parallel processing inside a GOP 12a, 12b as well as between GOPs 12a, 12b.

As can be seen in FIG. 1, pictures 10 are not placed in a one row, but rather distributed across multiple rows. This presentation is chosen to highlight the structural hierarchical temporal dependencies between pictures 10 and their association with temporal levels (TIds). With respect to the hierarchy, pictures 10 of the same temporal layer within a GOP such as 12a, 12b, except pictures of temporal level 0 (TId0), do not depend on each other. To be more precise, pictures indicated as being connected via a respective arrow do not necessarily depend on each other. Rather it is not forbidden. They can do so. Further, while pictures can generally depend on pictures of the same temporal level preceding the current picture in decoding order, the sort of dependency order described with respect to FIG. 1 is a requirement or prerequisite for parallelization approaches described hereinafter. So, depending on temporal level, some pictures can be processed in parallel. For example, pictures 10 with POC 1, 3, 5, 7 inside of a GOP 0 can be processed in parallel. However, some coding tools still may introduce dependencies between pictures. This obstructs clean technical solution for parallel processing. The subsequently presented embodiment propose special mechanisms to overcome such issues.

Considering prediction and slices, a significant portion of the compression gain in current video coding standards is obtained from sophisticated prediction. This includes prediction from reconstructed signals using temporal and spatial filtering as well as symbol prediction to minimize signaling overhead transmitted in the bit stream. Symbol prediction is performed using the two adjacent CTUs, to the left and above the current CTU.

When transmitting symbols that belong to one picture, different framings are available. Each comes with benefits and disadvantages. The most effective way, with the smallest overhead and best local prediction capabilities is to send only one slice per picture. Another variant designed for error robustness is to divide a picture into multiple slices. Per default, slices do not use inter-slice prediction neither for symbol coding nor for spatial prediction, so each slice can be parsed and reconstructed independently in an arbitrary order. This adapted prediction scheme prevents error propagation and allows a flexible tradeoff between error robustness and R-D-performance. A further variant of transmitting symbols for a picture is called dependent slices. This approach focuses on parallel processing of individual CTU-lines, the wave front parallel processing (WPP), but not on error robustness. Due to restrictions that guarantee availability of prediction data, dependent slices have similar R-D performance compared to a single slice per picture, but with the degree of freedom to apply parallel execution on individual CTU-line. The extra requirement defines a minimal CTU-offset between consecutive CTU-lines that must not be violated. This offset guarantees that for a given CTU, reference CTUs to the left, above-left, above and above right that may be used for prediction, are already reconstructed and available.

CABAC Context Variables (CCV) are adaptive models representing a probability. The CCVs are used in combination with arithmetic entropy coding to model the entropy of a specific symbol or sets of symbols. The term adaptive indicates a permanent update of the model towards the current coded state to adapt to local statistics of the model. The update step is usually embedded in the arithmetic coding operation. At first the current state of the CCV is used to parameterize the arithmetic coding process, once the decoded symbol is derived it is used to update the CCV with a given step size towards the current decode probability.

Since the statistics for symbol values are varying, a set of CCVs is used to arithmetically code the slice data. However, before using a CCV either for encoding or for decoding, it has to be initialized to a predefined state. The default CCV initialization is performed when the decoding/encoding process of a new slice starts.

State of the art CABAC context initialization is done in the following manner. The default context initialization is done by applying an initialization function to a CCV. The function determines the initial CCVCMM state, calculated from CCVCMM specific constant values, selected via an index-parameter altered by slice-level QP.

Although, model initialization parameters are derived from empirical data collected in exhaustive tests with plenty of test material in order to achieve an initial state that is representative for a wide range of video material, the calculated initial state of a CCV often differs significantly from the state that would give an optimal setup for the actual content.

With the already mentioned WPP approaches the initialization performance gap would become a more serious problem because CCV involve a reset for each CTU-line. To overcome this performance gap a special initialization mechanism was introduced.

There is also some local CCV derivation technique used so far in ITU T H.265|MPEG H HEVC which supports for parallel processing. With wave front parallel processing CTU-lines can be handled independently by individual threads. To decouple the parsing process of the CTU-lines, it may be useful to reset the CABAC engine and initialize all CCVs at the beginning of each CTU-line. Because the default CCV initialization process does not necessarily model the content dependent CCV states in an optimal way, a new method for initialization was proposed in combination with dependent slices.

To enhance the CCV set up, only the first line in a picture is initialized using the default CCV initialization. All succeeding lines in the picture inherit the CCV states from the CTU-line above after the second CTU in the line above has been processed. Because this concept of initialization is only available for dependent slices, it can make use of the minimal CTU-offset that may be used.

Although this initialization method provides an improvement compared to line-wise default initialization, gain that can be achieved is limited due to the few CTUs that can contribute to updated process of the inherited CCVs.

Some sort of temporal CCV derivation was proposed and implemented in JEM-Software [2]. The basic idea is to exploit temporal analogies. Therefore a buffer is established that can store a snapshot of the states of CCV sets. The states of the CCV set are stored when the CTU in the center of the picture has been processed. In the implemented variant the CCV states are stored using the current slice-level QP as index into the buffer.

Figure 2:
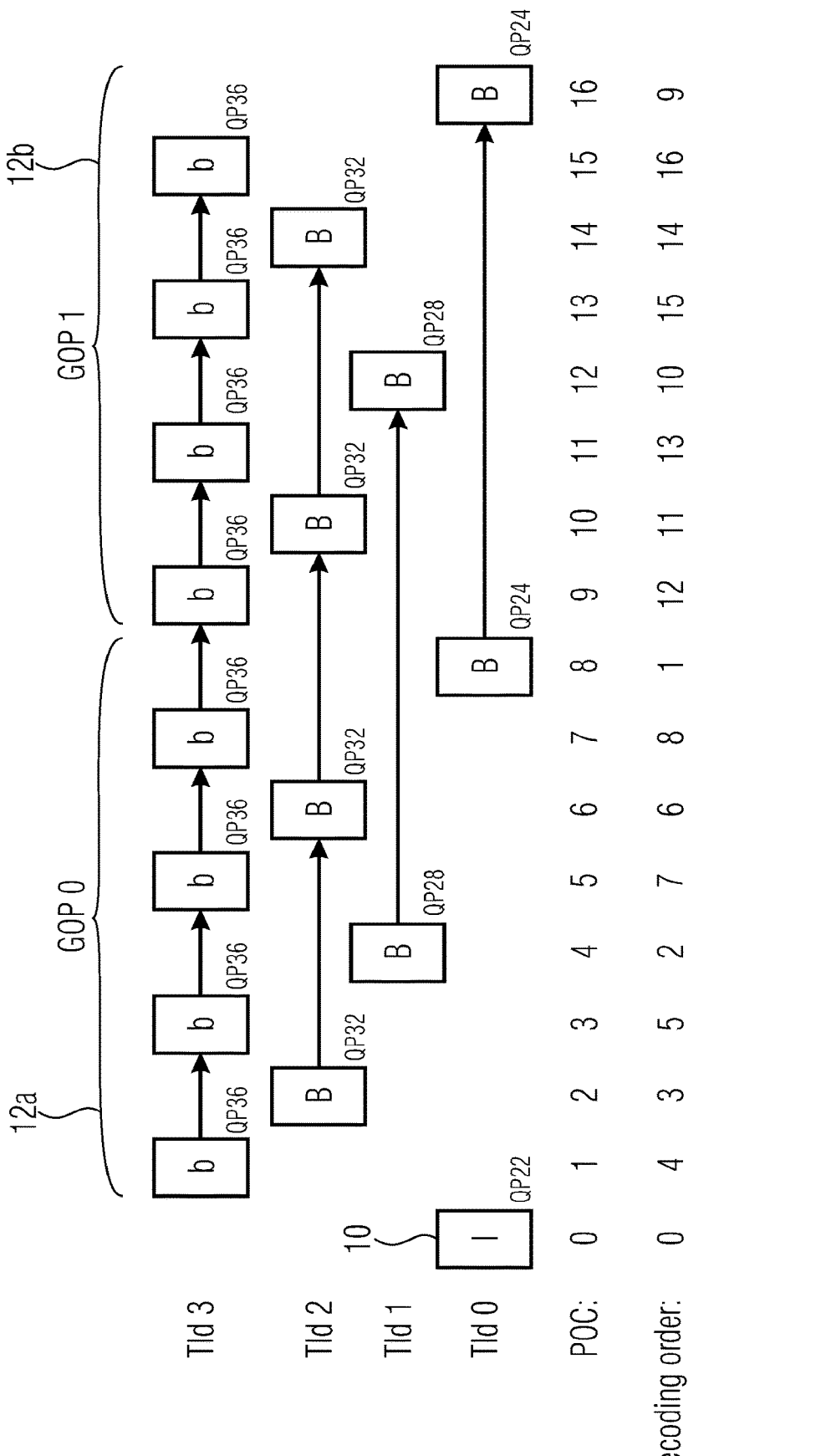
FIG. 2 shows a schematic diagram illustrating pictures of two GOPs coded in the manner depicted in FIG. 1, with FIG. 2 additionally illustrating a CABAC temporal propagation of context destroying the capability of parallelly coding/decoding pictures of the same temporal level such as the highest temporal level.

When a new decoding process of a succeeding picture is started, the CCV-buffer is checked for a valid CCV set stored for the current slice-level QP. See, for instance, FIG. 2 which shows by arrows the re-usage of CCV states by a picture pointed to by an arrow, the CCV states having been buffered and taken from pictures forming the origin of the arrows. If there is a set available the CCVs states are copied from the buffer into the current CCVs used for parsing/encoding. Otherwise, if no valid CMM set is available, the default initialization function is used to set up the current CCV set.

After having described certain coding tools known from HEVC or JEM, and their limits or disadvantages, the following description proceeds with a description of examples for video encoder and video decoder which may be implemented in a manner incorporating one or more of the subsequently explained embodiments. In particular, the presentation of this example for video encoder and video decoder may render easier the understanding of the subsequently explained embodiments, but it should be noted that the subsequently explained embodiments of the present application are neither restricted to form implementation variants of HEVC or JEM, nor implementation variants of the video encoder and video decoder described now with respect to FIGS. 3 to 5.

Figure 3:
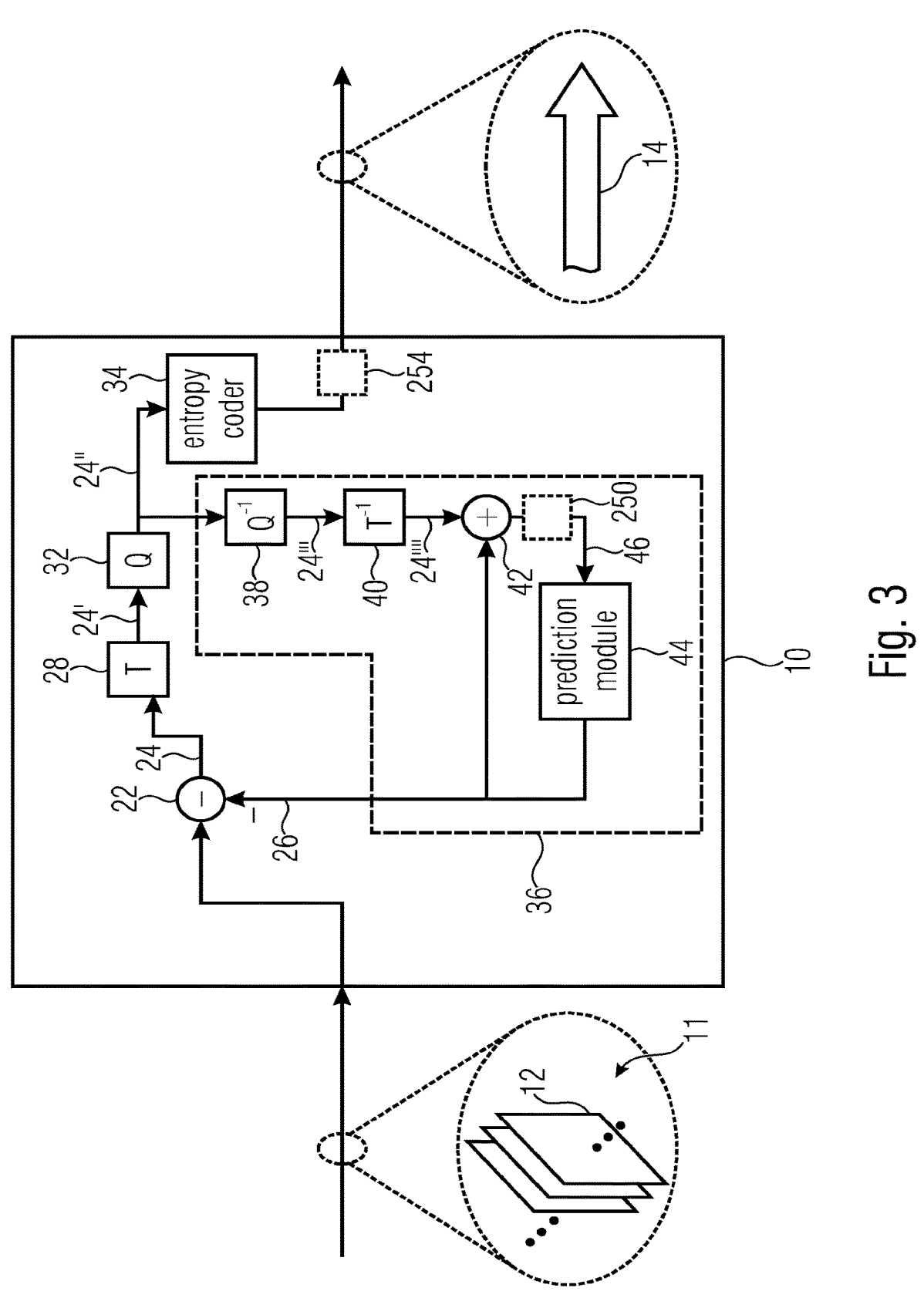
FIG. 3 shows a schematic diagram illustrating an internal implementation of a video encoder which may underlie any of the embodiments described with respect to FIGS. 6 to 16.
Figure 4:
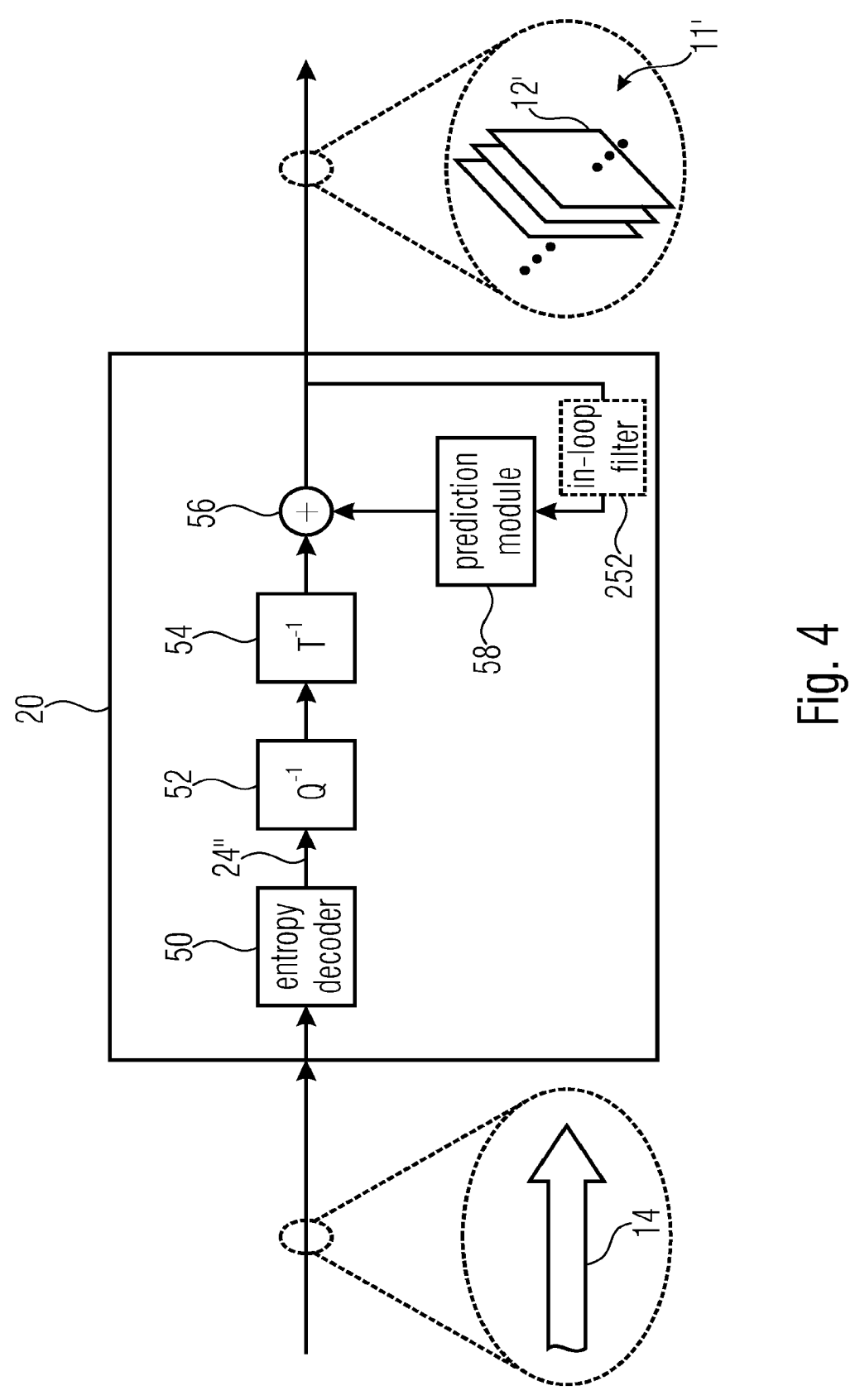
FIG. 4 shows a block diagram of a decoder fitting to the encoder of FIG. 3 and forming an example for an implementation of a video decoder in accordance with an embodiment described further below with respect to FIGS. 6 to 16.

FIG. 3 shows an apparatus for predictively coding a video 11 composed of a sequence of pictures 12 into a data stream 14. Block-wise predictive coding is used to this end. Further, transform-based residual coding is exemplarily used. The apparatus, or encoder, is indicated using reference sign 10. FIG. 4 shows a corresponding decoder 20, i.e. an apparatus 20 configured to predictively decode the video 11' composed of pictures 12' in picture blocks from the data stream 14, also here exemplarily using transform-based residual decoding, wherein the apostrophe has been used to indicate that the pictures 12' and video 11', respectively, as reconstructed by decoder 20 deviate from pictures 12 originally encoded by apparatus 10 in terms of coding loss introduced by a quantization of the prediction residual signal. FIG. 3 and FIG. 4 exemplarily use transform based prediction residual coding, although embodiments of the present application are not restricted to this kind of prediction residual coding. This is true for other details described with respect to FIGS. 3 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. video 11 or a current picture 12. The prediction residual signal former 22 may, for instance, be a subtractor which subtracts the prediction signal from the original signal, i.e. current picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by encoder 10. The thus quantized prediction residual signal 24" is coded into bit-stream 14. To this end, encoder 10 may optionally comprise an entropy coder 34 which entropy codes the prediction residual signal as transformed and quantized into data stream 14. The prediction residual 26 is generated by a prediction stage 36 of encoder 10 on the basis of the prediction residual signal 24" decoded into, and decodable from, data stream 14. To this end, the prediction stage 36 may internally, as is shown in FIG. 3, comprise a dequantizer 38 which dequantizes prediction residual signal 24" so as to gain spectral-domain prediction residual signal 24'", which corresponds to signal 24' except for quantization loss, followed by an inverse transformer 40 which subjects the latter prediction residual signal 24'" to an inverse transformation, i.e. a spectral-to-spatial transformation, to obtain prediction residual signal 24'", which corresponds to the original prediction residual signal 24 except for quantization loss. A combiner 42 of the prediction stage 36 then recombines, such as by addition, the prediction signal 26 and the prediction residual signal 24"" so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra prediction, and/or temporal prediction, i.e. inter prediction. Entropy coder 34 entropy codes not only the prediction residual 24" into the data stream, but also other coding data which describes the pictures such as, besides the residual data, prediction modes, prediction parameters, quantization parameters and/or filter parameters. The coding data represents the pictures. It may present the syntax elements coded into the data stream. The entropy coder 34 encodes this coding data in a lossless manner into the data stream 12. The entropy coding may be context-adaptive. That is, contexts are selected for a portion of the coding data currently to be entropy coded based on temporally and/or spatially neighboring, previously encoded coding data, each context having associated therewith a corresponding context entropy probability, i.e. an estimate of the symbol probability. The selected context's probability is used for the current entropy coded data entity and updated based on same. At the beginning, such as when starting entropy coding the coding data relating to one picture, the probabilities of the contexts are initialized. In accordance with some embodiments, details in this regard are set out below, but same are optional with respect to the other embodiments.

Likewise, decoder 20 may be internally composed of components corresponding to, and interconnected in a manner corresponding to, prediction stage 36. In particular, entropy decoder 50 of decoder 20 may entropy decode the quantized spectral-domain prediction residual signal 24" from the data stream. Context derivation may be done in a manner synchronous with the encoder. The result is the coding data including, for instance, the prediction residual data. Thereupon, dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 4, the output of combiner 56 results in the reconstructed signal, namely the video 11' or a current picture 12' thereof.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost, and/or using some rate control. As described in more details below, encoder 10 and decoder 20 and the corresponding modules 44, 58, respectively, support different prediction modes such as intra-coding modes and inter-coding modes. The granularity at which encoder and decoder switch between these prediction modes may correspond to a subdivision of the pictures 12 and 12', respectively, into blocks. Note that some of these blocks may be blocks being solely intra-coded and some blocks may be blocks solely being inter-coded and, optionally, even further blocks may be blocks obtained using both intra-coding and inter-coding. According to intra-coding mode, a prediction signal for a block is obtained on the basis of a spatial, already coded/decoded neighborhood of the respective block. Several intra-coding sub-modes may exist the selection among which, quasi, represents a kind of intra prediction parameter. There may be directional or angular intra-coding sub-modes according to which the prediction signal for the respective block is filled by extrapolating the sample values of the neighborhood along a certain direction which is specific for the respective directional intra-coding sub-mode, into the respective block. The intra-coding sub-modes may, for instance, also comprise one or more further sub-modes such as a DC coding mode, according to which the prediction signal for the respective block assigns a DC value to all samples within the respective block, and/or a planar intra-coding mode according to which the prediction signal of the respective block is approximated or determined to be a spatial distribution of sample values described by a two-dimensional linear function over the sample positions of the respective block with deriving tilt and offset of the plane defined by the two-dimensional linear function on the basis of the neighboring samples. Alternatively or additionally, intra prediction modes may use intra pattern search (locating a patch within an already processed portion of the current picture using same as a predictor) with explicit or implicit indication of the patch to be used, intra prediction where the predictor is provided in transform domain directly such as by used of a neural network, and/or a prediction transform coefficients from neighboring residual block in transform domain directly. Compared thereto, according to inter-prediction mode, a prediction signal for a block may be obtained, for instance, by temporally predicting the block inner. For parametrization of an inter-prediction mode, motion vectors may be signaled within the data stream, the motion vectors indicating the spatial displacement of the portion of a previously coded picture of the video 11 at which the previously coded/decoded picture is sampled in order to obtain the prediction signal for the respective block. This means, in addition to the residual signal coding comprised by data stream 14, such as the entropy-coded transform coefficient levels representing the quantized spectral-domain prediction residual signal 24", data stream 14 may have encoded thereinto prediction related parameters for assigning to the blocks prediction modes, prediction parameters for the assigned prediction modes, such as motion parameters for inter-prediction modes, and, optionally, further parameters which control a composition of the final prediction signal for the blocks using assigned prediction modes and prediction parameters. Additionally, the data stream may comprise parameters controlling and signaling the subdivision of picture 12 and 12', respectively, into the blocks. The decoder 20 uses these parameters to subdivide the picture in the same manner as the encoder did, to assign the same prediction modes and parameters to the blocks, and to perform the same prediction to result in the same prediction signal.

Figure 5:
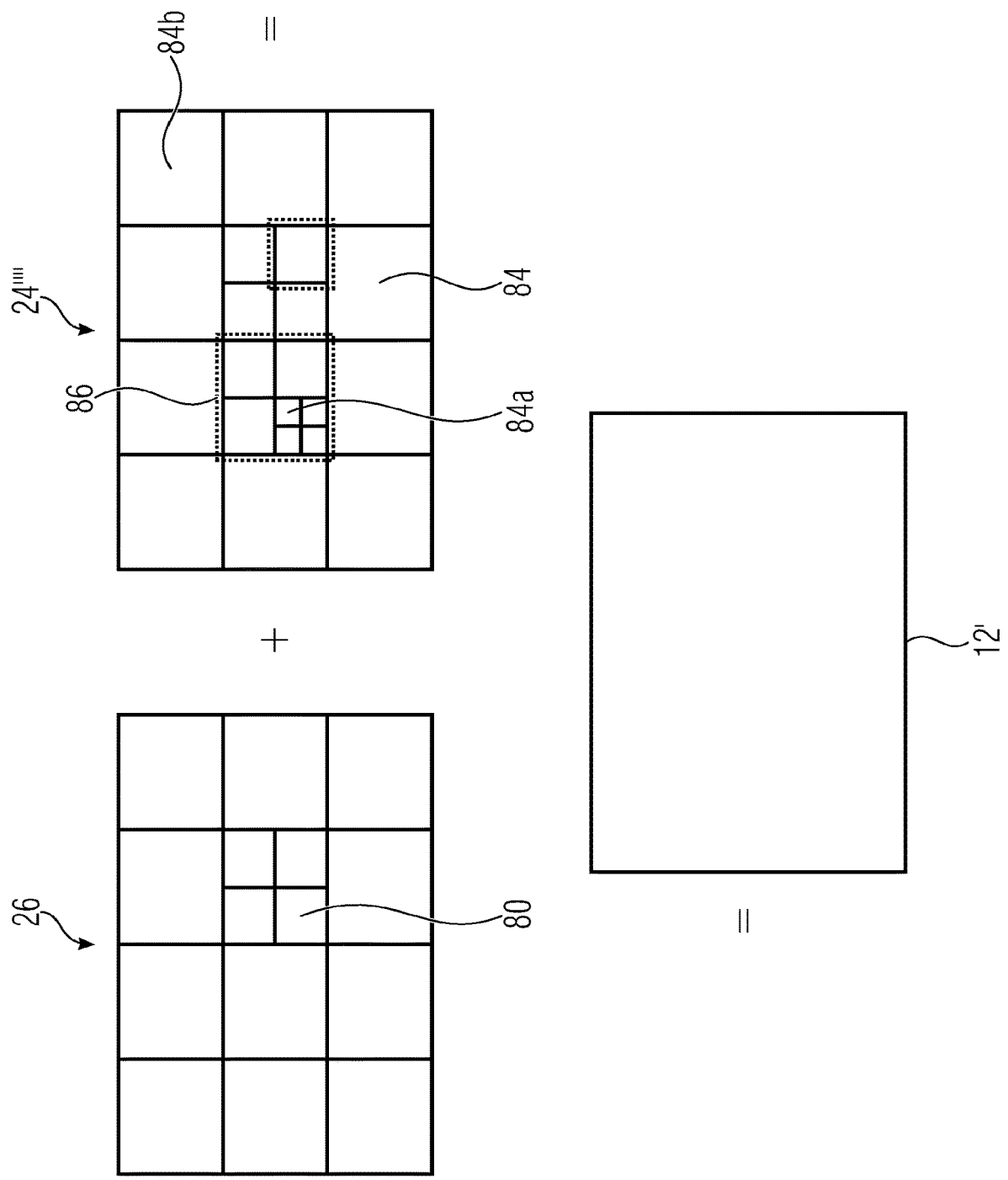
FIG. 5 shows a schematic diagram illustrating a partitioning of a picture into blocks for sake of prediction and residual coding as an example.

FIG. 5 illustrates the relationship between the reconstructed signal, i.e. the reconstructed picture 12', on the one hand, and the combination of the prediction residual signal 24"" as signaled in the data stream, and the prediction signal 26, on the other hand. As already denoted above, the combination may be an addition. The prediction signal 26 is illustrated in FIG. 5 as a subdivision of the picture area into blocks 80 of varying size, although this is merely an example. The subdivision may be any subdivision, such as a regular subdivision of the picture area into rows and columns of blocks, or a multi-tree subdivision of picture 12 into leaf blocks of varying size, such as a quadtree subdivision or the like, wherein a mixture thereof is illustrated in FIG. 5 where the picture area is firstly subdivided into rows and columns of tree-root blocks which are then further subdivided in accordance with a recursive multi-tree subdivisioning to result into blocks 80.

The prediction residual signal 24"" in FIG. 5 is also illustrated as a subdivision of the picture area into blocks 84. These blocks might be called transform blocks in order to distinguish same from the coding blocks 80. In effect, FIG. 5 illustrates that encoder 10 and decoder 20 may use two different subdivisions of picture 12 and picture 12', respectively, into blocks, namely one subdivisioning into coding blocks 80 and another subdivision into blocks 84. Both subdivisions might be the same, i.e. each block 80, may concurrently form a transform block 84 and vice versa, but FIG. 5 illustrates the case where, for instance, a subdivision into transform blocks 84 forms an extension of the subdivision into blocks 80 so that any border between two blocks 80 overlays a border between two blocks 84, or alternatively speaking each block 80 either coincides with one of the transform blocks 84 or coincides with a cluster of transform blocks 84. However, the subdivisions may also be determined or selected independent from each other so that transform blocks 84 could alternatively cross block borders between blocks 80. As far as the subdivision into transform blocks 84 is concerned, similar statements are thus true as those brought forward with respect to the subdivision into blocks 80, i.e. the blocks 84 may be the result of a regular subdivision of picture area into blocks, arranged in rows and columns, the result of a recursive multi-tree subdivisioning of the picture area, or a combination thereof or any other sort of segmentation. Just as an aside, it is noted that blocks 80 and 84 are not restricted to being quadratic, rectangular or any other shape. Further, the subdivision of a current picture 12 into blocks 80 at which the prediction signal is formed, and the subdivision of a current picture 12 into blocks 84 at which the prediction residual is coded, may not be the only subdivision used for coding/decoding. These subdivisions form a granularity at which prediction signal determination and residual coding is performed, but at other granularities than these subdivisions, encoder and decoder may set certain coding parameters which might include some of the aforementioned parameters such as prediction parameters and the like.

FIG. 5 illustrates that the combination of the prediction signal 26 and the prediction residual signal 24"" directly results in the reconstructed signal 12'. However, it should be noted that more than one prediction signal 26 may be combined with the prediction residual signal 24"" to result into picture 12' in accordance with alternative embodiments such as prediction signals obtained from other views or from other coding layers which are coded/decoded in a separate prediction loop with separate DPB, for instance.

In FIG. 5, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

In any case, it should be noted that the set of supported transforms may comprise merely one transform such as one spectral-to-spatial or spatial-to-spectral transform.

As already outlined above, FIGS. 3 to 5 have been presented as an example where the embodiments described further below may be implemented in order to form specific examples for video encoders and decoders according to the present application. Insofar, the video encoder and decoder of FIGS. 3 and 4, respectively, represent possible implementations of the video encoders and decoders described herein below. However, they are merely representative examples. With respect to the block-subdivisioning into blocks 80, it is noted that same may be done in the manner outlined with respect to FIG. 5 or in a different manner. A subdivisioning into transform blocks, if present, may also be done as described with respect to FIG. 5 or in a different manner. In particular, the subdivisioning into blocks on the one hand and into other blocks on the other hand, such as transform blocks, may be done independent from each other by separately subdividing picture 12 into these blocks, respectively, or in a dependent manner. For instance, one subdivision such as the subdivision into transform blocks, may form an extension of the other subdivision as described above, or both subdivisions may form separate extensions of a common primary subdivision such as, for instance, the subdivision of the picture into an array of tree root blocks 86 as described with respect to FIG. 5. And such possibilities also apply for other sub-picture granularities which will be mentioned below such as with respect to the definition of certain prediction parameters, prediction modes or the like. Different subdivisions may be used for different ones of these entities and same may be defined independent from each other, partially independent or as extensions from one another.

Having said this, the following description concentrates on what has not been described so far with respect to FIGS. 3 to 5, namely capabilities and coding tools implemented in the video encoder and the video decoder according to the various embodiments described below. These coding tools and specifics are described below with respect to the specific embodiments as it is not necessary that these coding tools are implemented in the video encoder and the video decoder according to the various aspects concurrently with respect to each of these embodiments.

Figure 6:
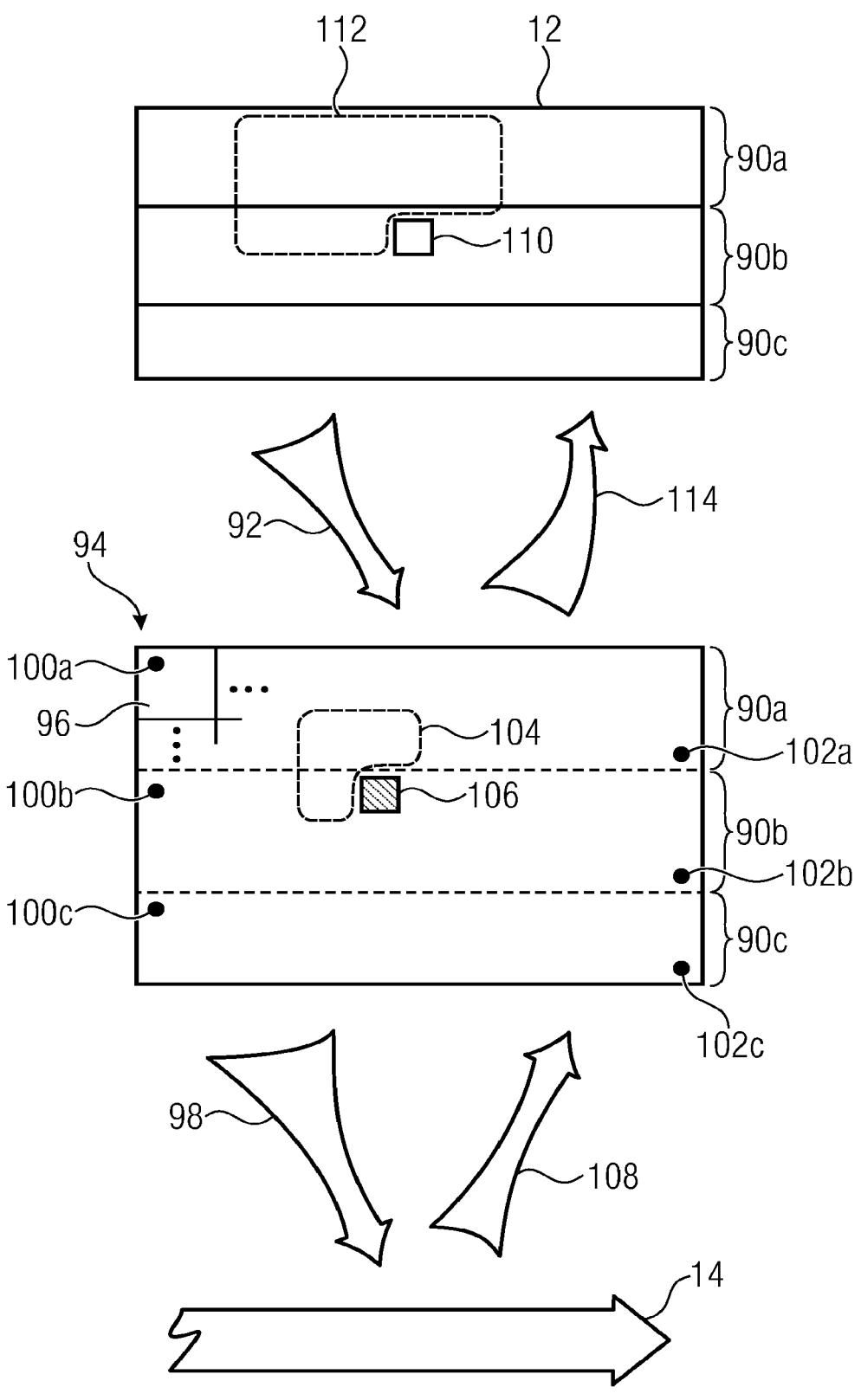
FIG. 6 shows a schematic diagram illustrating a functionality of video encoder and video decoder which offer the encoding and the decoding of a video in a WPP manner, wherein the basis functionality depicted in FIG. 6 may underlie the embodiments of video encoder and video decoder described with respect to FIGS. 7 to 16.

An embodiment, which is described now first, concerns the first aspect of the present application and relates to a video codec where a video encoder and a video decoder use a stripe-wise entropy encoding of coding data describing a certain picture into the data stream 14. In order to describe this frame work or concept used by video encoder and video decoder according to the embodiments of the present application concerning the first aspect described hereinafter, reference is made to FIG. 6. FIG. 6 shows a picture 12 of the video 11 to be coded and as it is depicted in FIG. 6, picture 12 is partitioned into stripes 90a, 90b and 90c. The number of stripes is not critical. Stripes 90a to 90c may be formed by rows of tree root blocks as they were introduced in FIG. 5. That is, the stripes 90a to 90c partition the picture 12 and cross the picture 12 in a mutually parallel manner. The significance of the stripes 90a to 90c is as follows. By use of block-based coding, picture 12 is coded into coding data. The encoding procedure is illustrated in FIG. 6 using arrow 92. The coding data is illustrated in FIG. 6 using reference sign 94 and shown as being arranged in a manner corresponding to the picture area of picture 12. As the encoding 92 is block-based, the coding data 94 describes picture 12 in unit of blocks 96 such as coding blocks 80 and/or transform blocks 84. The coding data 94 has, accordingly, some sort of spatial association to picture 12. The coding data 94 may, for instance, be a collection of syntax elements describing picture 12 each relating to a certain block or portion. The coding data 94 may, as described above, comprise residual sample values such as transform coefficients, prediction parameters and prediction modes.

The coding data 94 is entropy coded into data stream 14 using entropy coding 98. This entropy coding is, however, not done using one go. That is, the coding data 98 is encoded into data stream 14 by the video encoder using context-adaptive entropy coding along the stripes 90a to 90c. That is, the coding data 94 relating to a certain stripe is coded into data stream separately, thereby forming a substream per stripe 90a-90c which could be called a WPP substream. To this end, for each stripe 90a to 90c, the context entropy probabilities and, optionally, internal states such as probability interval parameters in case of using arithmetic coding, are initialized at a starting point 100a, 100b and 100c of the stripes 90a to 90c and adapted to the actual statistics, mainly updated according to the actual values of the coding data, during coding the respective stripe from its starting point 100i to its end which is, in FIG. 6, at the right-hand side of picture 12. In other words, the portion of coding data 94 relating to stripe 90a is entropy coded from starting point 100a to some end point 102a with context initialization at starting point 100a and continuous context update or adaptation from starting point 100a to end point 102a. Likewise, the coding data 94 concerning stripe 90b is entropy coded 98 from starting point 100b to end point 102b with context initialization at starting point 100b and continuous context adaptation during encoding towards endpoint 102b and the same applies to the other stripes, here stripe 90c. The decoding takes place in the same manner as the same contexts are derived and the same initializations are performed.

The specific issue which the subsequently described embodiment relates to pertains to the context initialization at the starting points 100a and 100c. One option would be to perform the context initialization in a default manner anew for each stripe 90a to 90c irrespective of, or independent from, context updates/adaptations of, in coding order, preceding stripes of the same picture 12 or in a previously encoded/decoded picture. As explained above, this may be done by selecting default context entropy probabilities depending on the quantization parameter associated with a respective stripe 90a-90c such as its slice quantization parameter. As described later on, this initialization method may still form one mode for context initialization in addition to the one described now. Another option chosen in HEVC, for example, is to initialize the context entropy probabilities for any second or following stripe in coding order leading from top to bottom, for instance, on the basis of a state of the context entropy probabilities updated for an immediately preceding stripe of the same picture until some intermediate point between its starting point and end point. The initialization of the stripes of each picture would be done, thus, independent from context entropy probabilities of stripes of other pictures. As described later on, this initialization method may also still form one mode for context initialization in addition to the one described now.

The embodiments described further below go one step further and allow for an initialization of context entropy probabilities for each stripe including the first one in coding order of a certain picture 12, on the basis of context entropy probabilities adapted/updated in a co-located stripe of any previously coded/decoded picture will be described in more detail below.

Before this, however, it should be noted that the encoding/decoding concept of FIG. 6 may be done in a manner supporting WPP processing. For instance, the entropy encoding 98 may be performed in a manner so that the context selection or context modeling is performed in a manner dependent on a spatial neighborhood 104 of a currently entropy encoded portion 106 of a current stripe. The spatial neighborhood 104 is like a spatial template which is positioned at the current entropy coded block 106 and as long as currently processed, i.e., currently encoded/decoded, portions of other stripes of the same picture such as the ones preceding encoding order, are nearer to its respective end point than any spatial neighborhood 104 extends into any neighboring or other stripe such as the one immediately preceding in coding order, a parallel processing of the stripes, i.e., a parallel encoding/decoding is feasible without violating the availability of the coding data within the spatial neighborhood 104 on the basis of which the context for the currently entropy coded portion 106 of the current stripe is determined. The spatial restriction of the spatial context derivation reach of neighborhood 104 also allows for a parallel implementation of the entropy decoding procedure illustrated by arrow 108 in FIG. 6.

Likewise, the encoding procedure 92 may involve spatial prediction of a currently encoded portion 110 on the basis of a spatial neighborhood 112 relative to the currently encoded portion 110. Just as context derivation region 104, the prediction source region 112 may extend into one or more neighboring stripes relative to the current stripe and as long as currently processed portions of any other stripe is nearer to its end point relative to region 112, the availability of data used as a source for the prediction of the current portion 110 of the current stripe is fulfilled. Spatial prediction may pertain to prediction of samples or prediction of coding parameters. The extension of the union of regions 104 and 112 thus, define some spatial intra-prediction coding dependency reach which allows for parallel performance of encoding 92 and entropy encoding 98 and the corresponding decoding procedure 108 and 114 as long as an inter-stripe coding offset/decoding offset does not conflict with the just-mentioned spatial intra-picture coding dependency reach.

Figure 7:
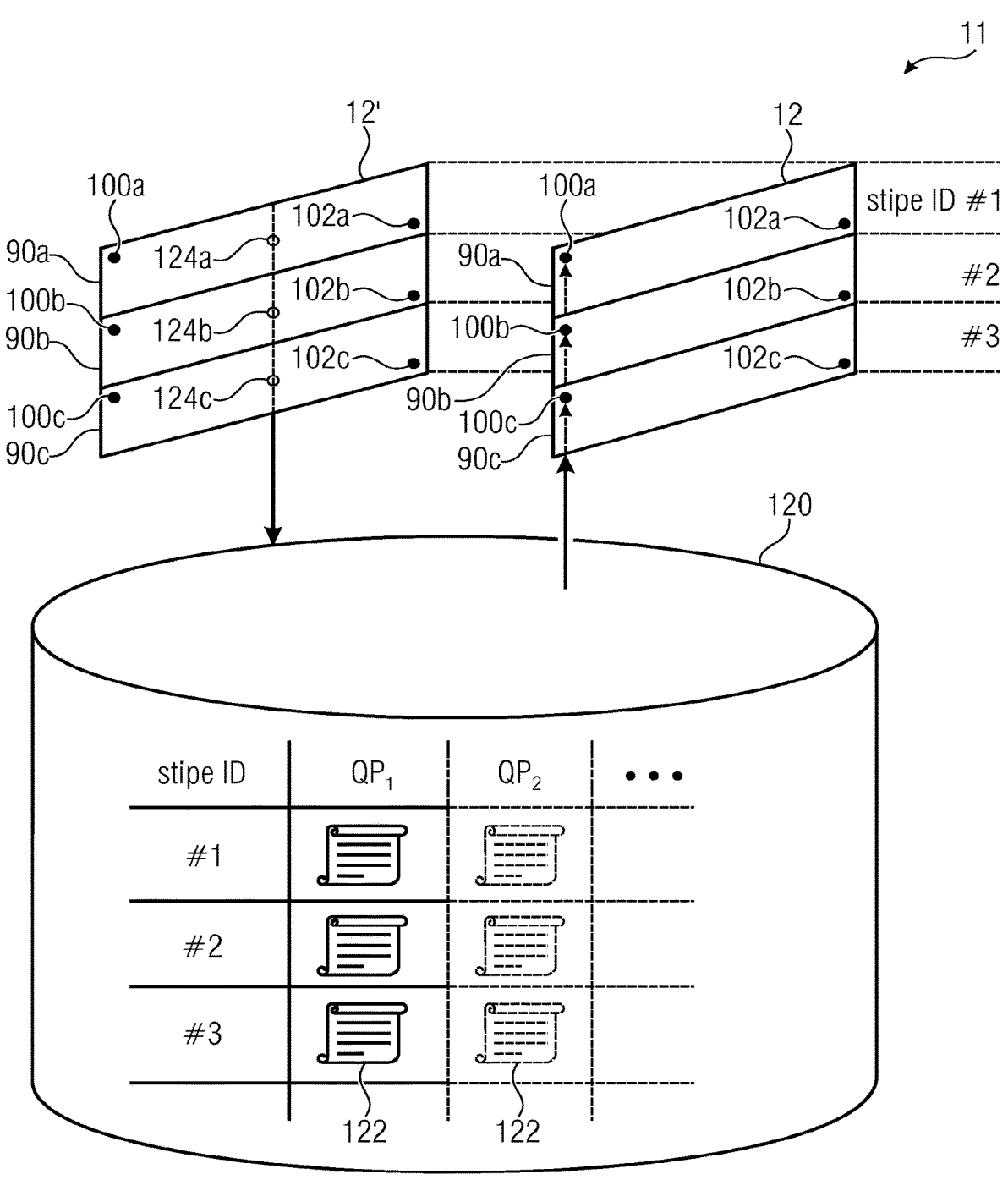
FIG. 7 shows a schematic diagram illustrating a functionality of a video encoder and a video decoder in accordance with an embodiment using a stripe location aware context entropy probability inheritance from one picture to another.

With respect to FIG. 7, video encoder and video decoder according to an embodiment is described which may be implemented as depicted and explained with respect to FIGS. 3 to 5, or may be implemented differently. In any case, video encoder and video decoder support the functionality discussed with respect to FIG. 6, i.e., a WPP enabling encoding/decoding or, differently speaking, the video coding is done in a manner enabling the video encoding and the video decoding to be performed in parallel with respect to the stripes. In other words, video coding is done in a manner so that, as long as concurrently processed portions of stripes 90*a-c* obey some inter-stripe coding offset, regions 104 and 112 never extend beyond, or cover, a currently processed portion of another stripe. Rather, the latter run ahead such regions spanned around the currently processed portions of other stripes. It should be noted, however, that in accordance with an alternative embodiment, the coding of the video data 94 is done in a manner not allowing parallel processing, for instance. Furthermore, spatial derivation of contexts as described within FIG. 6 with respect to region 104 may not necessarily be used. Special note is made to the fact that neither video encoder nor video decoder in accordance with an embodiment described with respect to FIG. 7 needs to actually perform parallel processing even if the embodiment of FIG. 6 is explained completely with respect to this circumstance. The video encoder may perform encoding serially with respect to the stripes thereby forming a data stream 14 which is decodable using WPP processing as well serial processing of the stripes.

In accordance with the embodiment of FIG. 7, both video encoder and video decoder comprise a buffer 120 for buffering states of the context entropy probabilities resulting from their adaptation up to certain buffering points as described later on. The buffer states 122 form a kind of reservoir or pool of most recently applied states which are used to initialize context entropy probabilities for stripes 90*a* to 90*c* of a currently processed picture 12. In particular, see FIG. 7, which shows a currently processed picture 12 as well as a previously processed, i.e., previously encoded/decoded, picture 12'. As described with respect to FIG. 6, the entropy encoding/decoding of the stripes 90*a* to 90*c* of picture 12' takes place from their starting points 100*a* to 100*c* along a common coding direction, namely from left to right in the example of FIG. 7, up to the end points 102*a* to 102*c*. Inbetween, there are the aforementioned buffering points 124*a* to 124*c*. Thus, the states of the context entropy probabilities as initialized at starting points 100*a* to 100*c*, are continuously updated/adapted according to the actual picture content of picture 12' and the intermediate states which result at buffering points 124*a* to 124*c* are the states which are buffered according to the embodiment of FIG. 7. They, thus, form a kind of snapshot of the context probabilities. As will be clear from the subsequent description, the buffering of intermediate states of context entropy probabilities as manifesting themselves up to buffering points 124*a* to 124*c* needs not to be buffered in buffer 120 at encoder and decoder for each picture of video 11. For instance, for some pictures, namely pictures of a certain temporal level, the buffering may be skipped. This may not play a role, however, for the embodiment described now and accordingly, this detail is left off for the time being. The buffering of the states 122 manifesting themselves in entropy coding each slice 90*a* to 90*c* of picture 12' may be buffered in buffer 120 in a manner distinguishing between states 122 stemming from stripes of different stripe positions. As depicted in FIG. 7, the pictures 12 and 12' of video 11 are partitioned into stripes 90*a* to 90*c* in the same manner so that the stripes are co-located to each other and each stripe 90 of picture 12 has a co-located stripe of the same stripe ID in picture 12'. The stripe ID aware buffering is illustrated in FIG. 7 by showing that a buffered state 120 is buffered in buffer 120 for each stripe ID or, alternatively speaking, for each stripe position. That is, the buffered states are buffered in a table. The buffering in buffer 120 may be done in a manner so that buffer 120 stores, for each stripe ID, the most recently buffered state 120 only. That is, an older state corresponding in strip ID, and optionally in one or more further criteria mentioned hereinafter, to the newly buffered state is replaced by the newly buffered one. As to the further the criteria, FIG. 7 exemplarily illustrates that buffered states 120 may additionally be distinguished according to their associated quantization parameter. Other criteria may pertain to the slice type, i.e. the type of prediction modes, (intra mode only, or intra and inter modes) associated with the respective stripe or the temporal level. To be more precise, the QP which has been used to encode/decode the coding data which has been, in turn, entropy encoded/decoded during context update/adaptation up to buffering point 124*a* to 124*c*, is used to distinguish the buffered states 120 resulting from the entropy coding in addition to distinguishing these states 122 according to the stripe ID of the stripe they belong to. The state 122 of a certain pair of associated stipe ID and quantization parameter QP among possible quantization parameters $QP_1$, $QP_2$ . . . would, accordingly replace or update the previously buffered state 122 of the same pair of stripe ID and quantization parameter QP. Other combinations of stripe ID with one or more criteria are feasible as well. The QP awareness is illustrated in FIG. 7 using dashed lines. As the just-mentioned QP, thus, the slice QP could be used. Same is assigned to a greater portion of the picture, namely a slice such as the whole stripe. However, in combination with a rate control, i.e. a locally varying QP, varying in blocks, for instance, the qp at the storage position or buffering point 124*a-c* could alternatively be used for storing of buffering the context states in the buffer in a manner distinguishing between different QPs. For loading or context update at the starting positions 100*a-c*, in turn, the slice QP or the local QP for the first block in the respective stripe could be used.

In initializing the context entropy probabilities, however, encoder and decoder look-up, for each stripe of current picture 12, a corresponding state in buffer 120, i.e., one of states 122. In particular, for each stripe 90*a* to 90*c* of current picture 12, video encoder and video decoder may form an index using an information on a location of the respective stripe within the current picture 12, i.e., using the stripe ID of the respective stripe, and using this index, encoder and decoder look-up the corresponding state 122 of that stripe ID in order to initialize the context entropy probabilities of the starting point 100_a_ to 100_c_ of the respective stripe 90_a_ to 90_c_. In case of QP awareness, the look-up is done addition-ally depending on the quantization parameter associated with a respective stripe 90_a_ to 90_c_ of the current picture 12. That is, for stripe 90_a_, for instance, the context entropy probabilities at starting point 100_a_ are initialized based on a buffered state 122 buffered for stripe ID number 1, i.e., the stripe ID corresponding to stripe 90_a_. In case of additional QP dependency, the look-up is done on the basis of the pair of stripe ID and the QP assigned to the respective stripe namely by looking-up state 122 in buffer 120 which corre-sponds to this pair of stripe ID and quantization parameter QP.

In the manner described, it is possible to inherit context entropy probabilities learned/updated in a previously pro-cessed picture 12'. The buffering points 124_a_ to 124_c_ may be positioned pretty near to the end points 120_a_ to 120_c_. There may even coincide to the end points 102_a_, 102_b_, 102_c_, but further possibilities are discussed below and may be used in order to avoid the context entropy probabilities being influ-enced or affected by statistical changes associated with edge phenomenons such as missing reference portions for pre-diction or the like. Owing to the stripe ID aware buffering, the reused or inherited context entropy probabilities thus inherited or reused from one picture 12' to another picture 12 relate to the same or similar picture content and accordingly, the states 122 used for initializing the context entropy probabilities of the stripes 90_a_ to 90_c_ of current picture 12 more closely represent the actual sample statistics subject to the context-adaptive entropy encoding procedure or corre-sponding decoding procedure 98 and 108, respectively.

Figure 8:
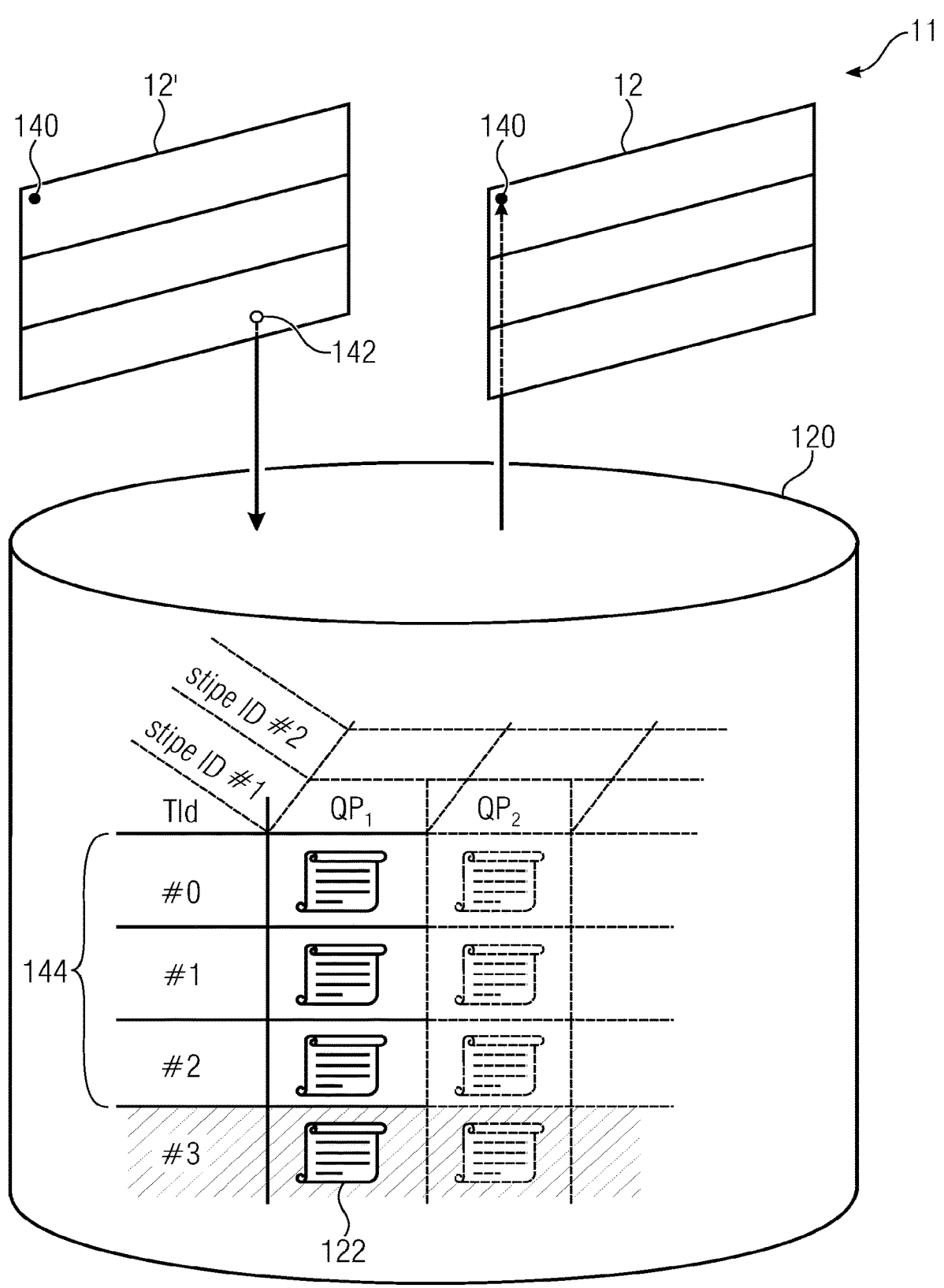
FIG. 8 shows a schematic diagram illustrating a functionality of a video encoder and a video decoder in accordance with an embodiment using temporal level aware context entropy probability inheritance from one picture to another.

In accordance with the embodiment described next with respect to FIG. 8, video encoder and video decoder may or may not be configured to encode/decode the pictures of video 11 in a manner described with respect to FIG. 6, i.e., allowing for WPP processing. Accordingly, in FIG. 8, pic-tures 12 and 12' of video 11, which correspond to the pictures discussed with respect to FIG. 7 are illustrated as being sub-divided into stripes merely as an option with indicating this circumstance by use of dashed-lines. How-ever, in accordance with the example of FIG. 8, video encoder and video decoder perform the task of encoding/decoding 92/114 of the coding data 94 and the entropy encoding 98 and entropy decoding 108 of the coding data 94 in any case in the following manner. In particular, the coding data 94 represents or codes the pictures 12 in a manner defining hierarchical temporal coding interdependencies between the pictures of the video as it has been illustrated in FIG. 1. That is, the pictures are classified into different temporal levels Tid wherein, for each temporal level, pic-tures of the respective temporal level are coded independent from pictures of temporal levels higher than the respective temporal level, and for each non-zero temporal level which forms a kind of base layer level, pictures of the respective non-zero temporal level are coded mutually independent. This is the way the coding data 94 is defined. As far as the entropy encoding 98 and entropy decoding 108 is con-cerned, same may be done in a manner not involving any inter-picture dependencies. That is, contexts, for instance, may be selected in a manner only using spatial neighbor-hood 104. Alternatively, entropy coding may also exploit temporal sources for context selection, but if so, the hierar-chical temporal coding interdependencies just-described with respect to coding data 94, i.e., with respect to coding 92 and decoding 114, is obeyed with respect to the entropy coding, i.e., with respect to 98 and 108, as well. In any case, some context-adaptive entropy coding is used for the entropy coding and decoding 98 and 108, and in doing so, for each picture of video 11, the context entropy probabilities are initialized at least at one starting point 140 within the respective picture. The starting point 140 may, for instance, be the starting point 108_a_ of the first stripe in stripe coding order when using the stripe partition-ing and the WPP enabling processing discussed with respect to FIG. 6. Or the initialization and buffering described now with respect to FIG. 8, is done in a stripe aware manner thereby using both, the concept of FIG. 7 as well as the concept of FIG. 8 discussed now. As further depicted in FIG. 8, some buffering takes place, namely the buffering of context entropy probability states adapted/updated from the at least one starting point 140 to some buffering point 142. Again, more than one buffering point 142 may be used such as one for each starting point. When using stripes, the buffering points may be positioned as described with respect to FIG. 7. When using one buffering point 142 and not using stripe partitioning, for instance, buffering point 142 may be a point in the mid of pictures of video 11.

In case of FIG. 8, however, the buffering of the state 142 representing the snapshot of context adaptation/update up to buffering point 142 is buffered in a temporal level aware manner. That is, the state 122 may be stored in a manner associated with the temporal level of the picture 12' the buffering point 142 is part of. FIG. 8 illustrates the fact that the buffering may additionally be performed in a manner aware of the associated quantization parameter underlying the coding data which the entropy coding and the context adaptation/updated up to the buffering point 142 from which the respective state 122 has been taken, relates to. In case of stripe partitioning, the stripe ID may be logged for each buffered state 122 as well. The buffer 120 thus filled accord-ing to the example of FIG. 8 may store, for instance, the most recently buffered state 122 for (a) a corresponding temporal level, (b) a pair of temporal level and one of quantization parameter or stripe ID or slice type, or (c) a triplet of temporal level and two of quantization parameter or stripe ID or slice type (d) a quadruple of all of these qualifiers. The buffering may be done, however, not for each picture. For instance, the buffering may merely be done with respect to states 122 manifesting themselves at the respec-tive buffering point 142 of pictures 12' which are of the non-highest temporal level as indicated by curly bracket 144 and the dashed marking of the portion of stored buffer states in buffer 120. The reason becomes clear when considering that buffered states of the highest layer are never used to initialize the context entropy probabilities of any picture 12. In particular, in initializing the context entropy probabilities at starting point 140 of picture 12, encoder and decoder may determine an index into buffer 120 using an information on a temporal level of current picture 12 and look-up, using this index, a state 120 which is buffered for a previously encoded/decoded picture such as picture 12' which is of a temporal level lower than the one for the current picture 12. In particular, by restricting context entropy probability inheritance or reuse in this manner, namely to the look-up of a buffered state 122 restricted to states stemming from lower-temporal-level pictures, it is possible to use pre-learned or updated context entropy probabilities of previ-ously encoded/decoded pictures with nevertheless enabling parallel coding of pictures of, for instance, the highest temporal level as discussed above with respect to FIG. 1.

Let's inspect the temporal level aware buffering and look-up in accordance with embodiments a little bit further. For instance, it has been described that the context entropy probabilities looked-up for context initialization at starting point 140 of picture 12 is done in a manner so that the initialization is done on the basis of a buffered state 122 which has been grasped from a picture 12' of a temporal level lower than the one of picture 12. Equality of the temporal level may, however, be admitted in case of picture 12 being a member of the zero level, i.e., the lowest level forming a kind of base temporal level. As far as the buffering of states manifesting themselves at a buffering point 142 of a picture 12' is concerned, the following is noted. The buffering is made temporal level aware. For instance, states 122 of pictures 12' at the highest temporal level are not stored as there is no picture which could look-up such states for use of context initialization owing to the temporal level restriction. For all other pictures, the states manifesting themselves at the corresponding buffering point 142 may be buffered in buffer 120. Instead of buffering same in a table only once, however, such as at an entry corresponding to the corresponding temporal level and, in case of the context inheritance also being QP, stripe ID and/or slice type aware, at the corresponding entry of temporal level, QP, stripe ID and/or slice type, this state 122 of this picture 12' may also be used to overwrite or replace the corresponding buffered states 122 of higher temporal levels. Thus, if picture 12' is of temporal level zero, its state 122 would be entered in buffer 120 for temporal level zero as well as the higher temporal levels. If picture 12' is of temporal level one, its state 122 at buffering point 142 is entered in buffer 120 for temporal level one as well as the higher temporal levels, i.e., temporal level two. At the time of initializing the context entropy probabilities at starting point 140 of picture 12, the index derived from the temporal level of picture 12 may then point to the corresponding position in buffer 120 for the temporal level one lower than the temporal level of picture 12. This is, then, the most recently buffered state 122, possibly additionally corresponding in QP and/or slice ID and/or slice type to picture 12, which is of lower temporal level. However, different approaches for buffering states 122 are feasible as well. Instead of buffering the states 122 in buffer 120 in form of a table storing states 122 in a manner addressable by a vector composed of a temporal level and, optionally, stripe ID and/or QP and/or slice type, the states 122 could be buffered in buffer 120 in a one-dimensional linear manner. An index which could then be used for indexing could determine the rank of the corresponding state 122 to be used for context initialization at starting point 140 of current picture 12. The rank could correspond to the order at which the states 122 have been buffered. In determining the state to be used for picture 12, encoder and decoder may, for instance, traverse the buffered states 122 from a most recently buffered state 122 to a least recently buffered state in order to determine one which is of lower temporal level (optionally admitting equality in case of picture 12 being of level 0), and optionally, correspond in stripe ID and/or QP and/or slice type to the stripe ID and/or QP and/or slice tape relevant for starting point 140, wherein the one encountered first, i.e., the most recently buffered one, is used for the context initialization. Alternatively, a combination, such as a mean, of a number of most recently ones of such states, meeting the search criteria, may be used for initialization.

Before proceeding with embodiments of further aspects of the present application, a brief description shall be provided as to how the embodiments of FIGS. 7 and 8 might be implemented in HEVC or JEM. For instance, the concept of FIG. 7 and/or the concept of FIG. 8 could be offered as one mode of CABAC context variable states inheritance from previously coded/decoded pictures which mode could be signaled at some high-level such as in SPS, PPS or slice header by a specific variable like cabac_temporal_init_mode such as, for example, in the SPS as depicted in FIG. 9. That is, one mode option of the syntax element could correspond to the CABAC context variable state inheritance from a previously decoded/coded picture as described above and currently used in JEM, and one mode may correspond to the concept of FIG. 7 and/or another value of the syntax element to the concept of FIG. 8.

For example, the just-mentioned syntax element could have the following semantic:

cabac_temporal_init_mode equal to 0 specifies that the temporal mode is disabled and the conventional initialization from predefined tables is used, as described above, i.e., initialization based on QP only, irrespective of other stripes.

cabac_temporal_init_mode equal to 1 specifies that the temporal initialization mode for CABAC context variables is done by adoption of context states of previously decoded picture. Accordingly, this can be represented by the following adaptation rule:

$$CCV_{SliceType,QP}=CCVRef_{SliceType,QP}$$

Where CCV is CABAC context variables buffer of current picture 12, the buffer buffering the probabilities to be initialized at starting point 140, SliceType is type of current slice of picture, QP is a quantization parameter value.

CCVRef is a reference context variables buffer of previously decoded picture with the same SliceType and QP.

If CCVRef for particular SliceType and QP is not available (i.e. when decoding first picture), the conventional initialization method from predefined tables is used, as described for mode zero.

The additional initialization modes that should improve the temporal method of CABAC adaptation as well as improve the parallelization throughput are the following:

cabac_temporal_init_mode equal to 2 specifies that the temporal initialization mode for CABAC context variables is done by adoption of context states of previously decoded picture CTU-line-wise. Accordingly, the CABAC initialization process can be represented by the following adaptation rule:

$$CCV_{SliceType,QP,CTULineNum}= CCVRef_{SliceType,QP,CTULineNum}$$

Where CCV is CABAC context variables buffer of current picture 12, SliceType is type of current slice of picture, QP is a quantization parameter value, CTULineNum is a CTU line number.

CCVRef is a reference context variables buffer of previously decoded picture 12' with the same SliceType, QP and CTULineNum. If CCVRef for particular SliceType, QP and CTULineNum is not available (i.e. when decoding the first picture), the conventional initialization method using predefined tables is used as taught with mode zero.

cabac_temporal_init_mode equal to 3 specifies that the temporal initialization mode for CABAC context variables shall be done by adoption of context states of previously decoded picture of same temporal level. This can be represented by the following adaptation rule:

$$CCV_{TId}=CCVRef_{TId}$$

Where CCV is CABAC context variables buffer of current picture, TId is a temporal level Id of current picture.

CCVRef is a reference context variables buffer of a previously decoded picture in temporal level TId.

If CCVRef is not available (i.e. when decoding first picture), the conventional initialization method using predefined tables is used.

cabac_temporal_init_mode equal to 4 specifies that the temporal initialization mode for CABAC context variables shall be done by adoption of context states of previously decoded picture in current temporal level and the states are adopted CTU line-wise. Accordingly, the CABAC initialization process can be represented by the following adaptation rule:

$$CCV_{TId,CTULineNum}=CCVRef_{TId,CTULineNum}$$

Where CCV is CABAC context variables buffer of current picture 12, TId is a temporal level Id of current picture, CTULineNum is a CTU line number.

CCVRef is a reference context variables buffer of a previously decoded picture 12' in temporal level TId.

If CCVRef is not available (i.e. when decoding first picture), the conventional initialization method using predefined tables is used.

cabac_temporal_init_mode equal to 5 specifies that the temporal initialization mode for CABAC context variables shall be done by adoption of context states of previously decoded pictures of previous temporal level, as done in FIG. 8. This can be represented by the following adaptation rule:

$$CCV_{TId}=CCVRef_{TIdRef}$$

Where CCV is CABAC context variables buffer of current picture 12, TId is a temporal level Id of current picture.

CCVRef is a reference context variables buffer of a single picture 12' or a combination of context variables of multiple pictures in temporal level TIdRef, that precede the current picture in decoding order.

TIdRef is derived as follows: TIdRef=TId−1 when TId>0, otherwise 0.

If CCVRef for particular TIdRef is not available (i.e. when decoding first picture), the conventional initialization method using predefined tables is used.

cabac_temporal_init_mode equal to 6 specifies that the temporal initialization mode for CABAC context variables shall be done by adoption of context states of previously decoded pictures in previous temporal level as done in FIG. 8 and the states are adopted CTU line-wise, as done in FIG. 7. Accordingly, the CABAC initialization process can be represented by the following adaptation rule:

$$CCV_{TId,CTULineNum}=CCVRef_{TIdRef,CTULineNum}$$

Where CCV is CABAC context variables buffer of current picture 12, TId is a temporal level Id of current picture, CTULineNum is a CTU line number.

CCVRef is a reference context variables CTU-line buffer of a picture or as a combination of CCV CTU-line buffers of multiple pictures 12' in temporal level TIdRef, preceding the current picture in decoding order.

TIdRef is derived as follows: TIdRef=TId−1 when TId>0, otherwise 0.

If CCVRef for particular TIdRef, CTULineNum is not available (i.e. when decoding first picture), the conventional initialization method using predefined tables is used.

The CTU-line-wise CABAC-Context initialization from previous frames according to FIG. 7 and modes 2, 4 and 6 are described in more detail below.

To improve local adaption of CABAC-context variables, CCV initialization is done using a new buffer-dimension which is addressed by the CTU line number, i.e., a number index of stripe position.

The method utilizes a CCV buffer 120 that stores states of CCV sets 122 for each CTU-line, using buffer index to distinguish between multiple stored variants. The entire CMM buffer 120 can be reset to guarantee proper operation at random access points.

When the (de)coding process retrieves a positive store signal, the current states of the CCV from the current CTU line (de)coder are stored in the CCV buffer using the CTU line number and a further index to address the storage location in the buffer.

The store signal can be triggered by reaching a specific CTU-position 142 within the CU-line 90, which can be the last or any fix position within the CTU-line, e.g.
1. Fix position at ¾ of a CTU-line to exclude model updates from boundary CTUs.
2. The position of the last CTU that is completely located within the picture
3. The position of the last CTU, for which the top-right corner is contained in the picture boundaries In a succeeding picture 12, at the start 100a to 100c of each CTU-line 90a to 90c the CCV line buffer 120 is checked for a valid entry 122 for the current line given the buffer index. If there is an entry available, the CCV states are copied from the CCV line buffer 120 to the current CTU line coder's CCV set, otherwise if there are no CCVs available for the current line with the given buffer index, the coder uses the default context initialization concept without restrictions.

The advantages of the proposed CTU line wise temporal CCV prediction, are better local statistics exploitation. Furthermore, the method outperforms the current WPP initialization process.

For the buffer indexing two variants are available. The first variant uses the current slice-level QP as buffer index. The intention of using the QP as buffer index, assumes similar CCV states for same QPs in different pictures and implies the use of CCV from the same temporal level. However, prediction from the same temporal level can introduce problems when implementing frame parallel encoding approaches.

So a second variant derives the buffer index from the temporal level of the picture, to establish a prediction hierarchy that avoids temporal CCV prediction from pictures of the same or higher temporal level.

Temporal level restricted CABAC-Context initialization in detail according to FIG. 8 and modes 5 and 6 may be done as follows.

With the restriction of CABAC temporal initialization mode (cabac_temporal_init_mode 5 and 6) we enable parallelization of pictures with negligible coding efficiency loss. The restriction may be useful due to a different processing order of pictures caused by parallelization. The context variables adaptation from previous temporal level might include direct adoption of variables from picture to picture as well as selective weighted combination of them. This might also include a selective weighted combination of local predicted CCV from a CTU-line above of the current picture and of one or more temporal predicted CCVs. Weighted selection could be done by averaging context states, temporal distance aware averaging context states, or selecting particular context states out of multiple buffered CCVs.

Figure 10:
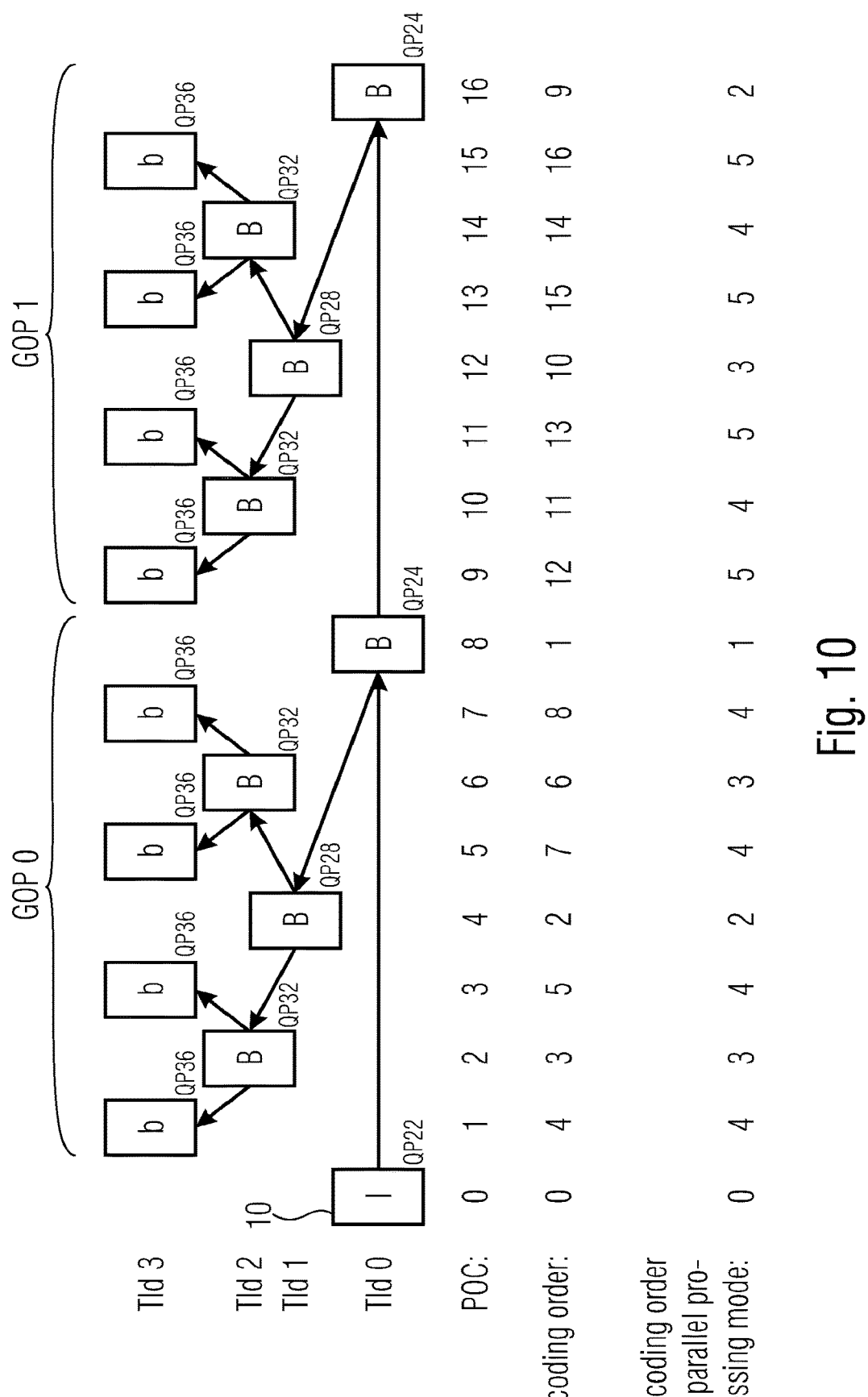
FIG. 10 shows a schematic diagram illustrating pictures of two GOPs coded in a manner depicted with respect to FIG. 1 as far as the temporal prediction dependencies is concerned, with FIG. 10 illustrating by use of arrows the temporal context entropy probability inheritance between the pictures in accordance with a concept corresponding to the one illustrated in FIG. 8.

The resulting CABAC propagation is shown in FIG. 10. When more frames are used for obtaining of CCVRef, then the propagation might correspond to the signal flow depicted in FIG. 1.

The above examples revealed that video encoder and video decoder may be implemented in a manner so as to operate according to FIG. 7 and FIG. 8 depending on a current mode setting conveyed in data stream 14. Further, the description brought forward with respect to the syntax element shown in FIG. 9 also revealed that additionally or alternatively, the context entropy probability management may be done in a manner being slice-type aware. For instance, I slices and P slices may be distinguished from one another, i.e., slices merely allowing for inter-prediction modes, and slices allowing both, intra-prediction and inter-prediction. And even further, context initialization at some starting point 100*a* to 100*c* or 140 may be done on the basis of a combination of buffered states 122 instead of just using the most recently buffered one for filling the respective search criteria including, for instance, stripe ID in accordance with a concept of FIG. 7, and including, for instance, being below the current picture's temporal level in case of the concept of FIG. 8.

Before proceeding with the description of embodiments of another aspect of the present application, a brief overview shall be provided as to the current state in the JEM reference software. In particular, the next aspect of the present application is about the parameterization of in-loop or post filters to be applied onto the pictures of the video. Such in-loop filter 250, 252 may, for instance, be positioned immediately upstream of the input of prediction module 44 and 58 in FIGS. 3 and 4, respectively, or may be a post-filter 254 positioned at the output of decoder 20 only. In the following, it is assumed that the filter, the parameterization of which the subsequent embodiments and aspect focuses on, is an adaptive loop filter, such as an FIR filter, but it should be clear that this is not restrictive for the embodiments described herein. The filter parametrization setting may pertain to a setting a filter taps of a filter kernel of the in-loop or post filter, selected to improve signal filtered.

For the next emerging standard ITU-T H.266 an Adaptive Loop Filter (ALF) is proposed. The current implementation is available through JEM reference software [2]. The ALF utilizes a particular parameter set where filter parameters are stored after processing of each picture. Encoder and decoder do this synchronously. For the temporal adaptation of parameters, the encoder is sending high-level information to identify particular parameters from set of all already stored parameters that shall be used for a current picture. Therefore, this may also include using parameters from previously decoded pictures of the same temporal level. Such a dependency is not practical for picture parallel processing.

To overcome this obstacle, in the particular embodiment described below we propose to restrict filter parameter propagation inside of current temporal level and instead of that, refer the parameters from the lower temporal levels only.

This could be done either by implicit definition of a specific operation point or by explicit high-level signaling (SPS, PPS, Slice Header). The latter can be implemented through a particular ALF-mode or a flag when using ALF inheritance exemplarily. Example of such flag signaled in SPS is given in FIG. 11.

The parameter behavior is defined by following semantic:
alf_temporal_init_restriction equal to 0 specifies that no temporal mode restriction is used. This results in the following adaptation rule:

$$\text{ALFParam}_{PicNum} = \text{ALFParam}_{PicNumRef}$$

where PicNum is a picture number in decoding order, PicNumRef is a picture number in decoding order preceding the PicNum in decoding order. PicNumRef is chosen by encoder and can be signaled explicitly for each picture within conventional ALF coding process.

alf_temporal_init_restriction equal to 1 specifies a restricted temporal adaptation for ALF parameters, where adaptation is allowed from previously decode picture of previous temporal levels only. Accordingly, it is restricted to use the pictures of current temporal level in the derivation process of PicNumRef.

With this restriction of the ALF parameters adaptation, we increase a parallelization throughput with some negligible coding efficiency loss.

Figure 12:
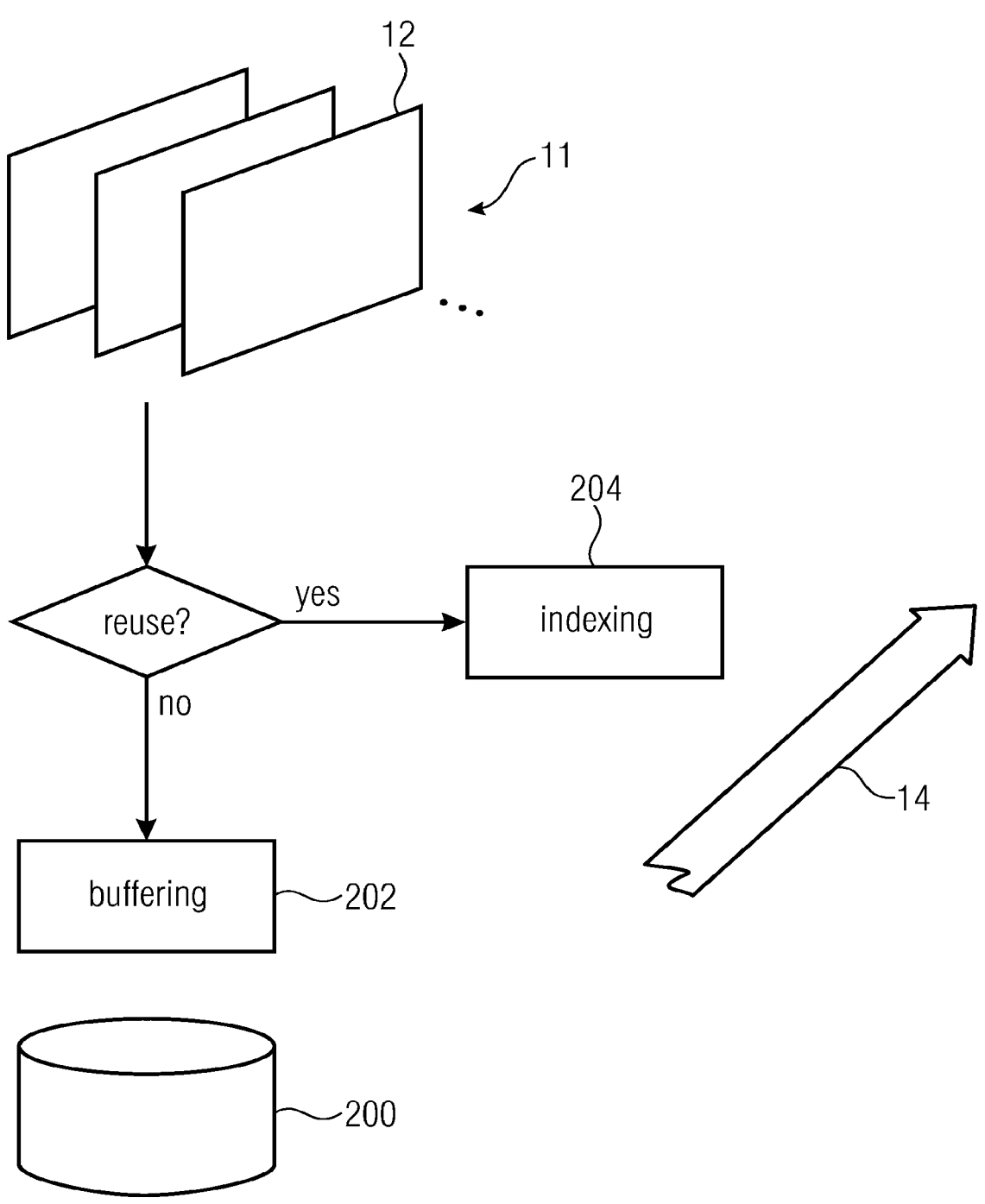
FIG. 12 shows a schematic diagram illustrating a functionality of a video encoder and a video decoder in accordance with an embodiment signaling a filter parameterization setting for pictures using a buffering scheme in a temporal level aware manner.

Having said this, see FIG. 12 according to which an embodiment for the functionality of a video encoder and a video decoder is explained. Both, video encoder and video decoder use in accordance with the embodiment of FIG. 12, block based coding of the pictures 12 of video 11 into data stream 14. The encoding or the encoding and decoding involves, for instance, an in-loop filter or post-filter, the parameterization of which is determined by the encoder and signaled to the decoder in a manner described in more detail below. Further, the encoding is done in a manner defining the hierarchical temporal coding interdependencies discussed with respect to FIG. 1 and FIG. 8, respectively.

The encoder determines for each picture 12 of video 11 a filter parameterization setting of the in-loop or post filter for parameterizing the respective filter when applied onto the respective picture. As explained in more detail below, encoder and decoder buffer in a buffer 200, a pool or reservoir of filter parameterization settings of the in-loop or post filter used in previously encoded/decoded pictures of video 11. The buffering may be performed selectively for pictures 12 only where the filter parameterization setting of the in-loop or post filter is determined by the encoder to be different from any filter parameterization setting buffered in buffer 200. For instance, the encoder may determine for a subset of pictures 12 that the filter parameterization setting of the in-loop or post filter for the pictures in this subset shall be signaled in data stream 14 explicitly, without indexing any filter parameterization setting buffered in buffer 200 and for such pictures 12, the filter parameterization setting is buffered 202. For the other subset of pictures 12, the filter parameterization setting is determined by the encoder to be equal to one of the buffered filter parameterization settings buffered in buffer 200 and the encoder signals 204 an index in data stream 14 for the respective picture which points in buffer 200 to the respective filter parameterization setting.

The decoder acts accordingly. That is, if a current picture's filter parameterization setting is signaled in the data stream 14 explicitly, it derives the filter parameterization setting form this explicit signalization and buffers same in buffer 200. If not, the decoder derives an index for the respective picture from data stream 14 which indexes a filter parameterization setting for the in-loop or post filter out of buffer 200. Same may not be buffered again. Encoder and decoder keep the content of buffer 200 synchronized which, for instance, buffers a certain number of most recently buffered filter parameterization settings in the order of their buffering and the index conveyed in data stream 14 may index the filter parameterization settings according to their buffering order, i.e., according to their rank they assume in buffer 200. Other possibilities may, however, exist as well. Further modification possibilities exist. For instance, instead of deciding for each picture 12 whether a buffered filter parameterization setting is adopted from buffer 200 completely or whether the filter parameterization setting of the respective picture is coded completely anew by way of explicit signalization in data stream 14, the filter parameterization setting of pictures for which the filter parameterization setting is chosen to be different from any of the filter parameterization settings stored in buffer 200 may be signaled in data stream 14 in form of a modification to one of the buffered filter parameterization settings, thereby sending for such pictures an index into buffer 200 in addition to filter parameterization modification. Such modified filter parameterization settings may be buffered by video encoder and video decoder, respectively, in buffer 200, while ones completely adopted from a buffered setting may not.

In any case, in accordance with the embodiment of FIG. 12, the filter parameterization setting of the in-loop or post filter for a current picture 12 for which an index is sent 204 in data stream 14 refers by this index merely to one out of a subset of the filter parameterization settings buffered in buffer 200 which subset excludes filter parameterization settings buffered for pictures of a temporal level higher than or equal to the current picture's temporal level.

Thus, in accordance with the embodiment of FIG. 12, the video encoder may perform the filter parameterization setting temporal level aware in that the video encoder decides on reusing a filter parameterization setting from buffer 200 completely or not with restricting the possible candidates for complete re-usage merely to a subset of the buffered filter parameterization settings, namely those which stem from pictures of a lower temporal level. Further, both video encoder and video decoder may act temporal level aware in that the buffering 202 is done in a manner temporal level aware. For instance, filter parameterization settings of pictures for which the filter parameterization setting has not been reused completely may, nevertheless, not be buffered 202 in case of the corresponding picture being of the highest temporal level so that it may not be indexed for any subsequently processed picture anyway. Even the signalization of the index at 204 may depend on the temporal level. For instance, no index may be present in the data stream 14 for pictures of the highest temporal level inevitably. Furthermore, the signalization of the index may be adapted to the size of the reduced subset of filter parameterization settings stemming from pictures only which are of lower temporal level. And even further, as denoted above, although the index may point to buffered filter parameterization settings according to a picture count index of the picture from which a certain buffered filter parameterization setting stems and which is stored in buffer 200 additionally to the respective filter parameterization setting, the index conveyed in data stream 14 may alternatively index to a buffered filter parameterization setting according to a linear rank address corresponding to a buffer rank in buffer 200 so that, for sake of keeping synchrony between video encoder and video decoder, both video encoder and video decoder need to perform the buffering of filter parameterization settings temporal level aware. In this regard, similar to the note in FIG. 8, it should be noted that the temporal level restriction may be alleviated for pictures of the lowest temporal level, i.e., level zero, as for these pictures, an index to filter task accordingly such as by parallelizing the decoding of pictures of the highest temporal level.

The embodiments described with respect to FIG. 8 on the one hand and those described with respect to FIG. 12 on the other hand may be combined in order to result into video encoders and video decoders capable of temporal inheritance of context entropy probabilities as well as buffer-based signalization of filter parameterization settings of an in-loop or post filter.

In the following, embodiments of a fourth aspect of the present application are described which pertain to video codecs such as HEVC and JEM which vary the quantization parameter used for quantizing the prediction residual signal in blocks across the pictures and signal the quantization parameter in so-called delta QPs, i.e., using spatial prediction.

In the state of the art standard [1], QP prediction is done by scaling down the sum of the two derived values from CU of spatial neighbors to the left and above the current CU, increased by 1, by a final right shift. The two derived values are obtained individually by checking the availability of the spatial neighbors. If the neighbor is available for prediction, then the derived value takes the QP of the neighbor CU, otherwise if the CU is not available for prediction, the derived value is set to the value of the variable prevCodedCUQP. The variable prevCodedCUQP is initialized with Slice QP, and updated for each coded CU within a Slice.

The disadvantage of this derivation scheme is that, for an encoder approach using parallel processing of individual CTU-lines according to WPP, but without applying the WPP-syntax to the bitstream, a dependency problem arises, because at the beginning of a certain CTU, the variable prevCodedCUQP is unknown to the line encoder, because it depends on the last coded QP which might be coded in any CTU-line above.

In the particular embodiment to overcome causality problems that may arise in highly optimized systems when using parallel encoding/decoding, a new simplified algorithm for spatial QP prediction is proposed as follows:

The adjacent neighbor Coding Units (CU) to the left, above and above-left of the current CU are evaluated. For each of the neighbor CU's an intermediate variable derivedQpXXX is introduced. If the neighbor is available, the variable derivedQpXXX is set to value of the QP of that neighbor CU, otherwise the variable is set to the value of the current slice-level QP.

The predicted QP is obtained by clipping the sum of the derivedQpLeft and derivedQpAbove lowered by derivedQpAboveLeft into the QP range spanned by derivedQpLeft and derivedQpAbove.

This can be described by following pseudo code:

```
if( derivedQpAbove <= derivedQpLeft )
    predictQp = max( derivedQpAbove , min(derivedQpLeft, ( derivedQpAbove +
    derivedQpLeft - derivedQpAboveLeft )) )
else
    predictQp = max( derivedQpLeft , min(derivedQpAbove, ( derivedQpAbove +
    derivedQpLeft - derivedQpAboveLeft )) )
``` parameterization settings stemming from pictures of the same level, namely level zero, might be allowed.

Figure 13:
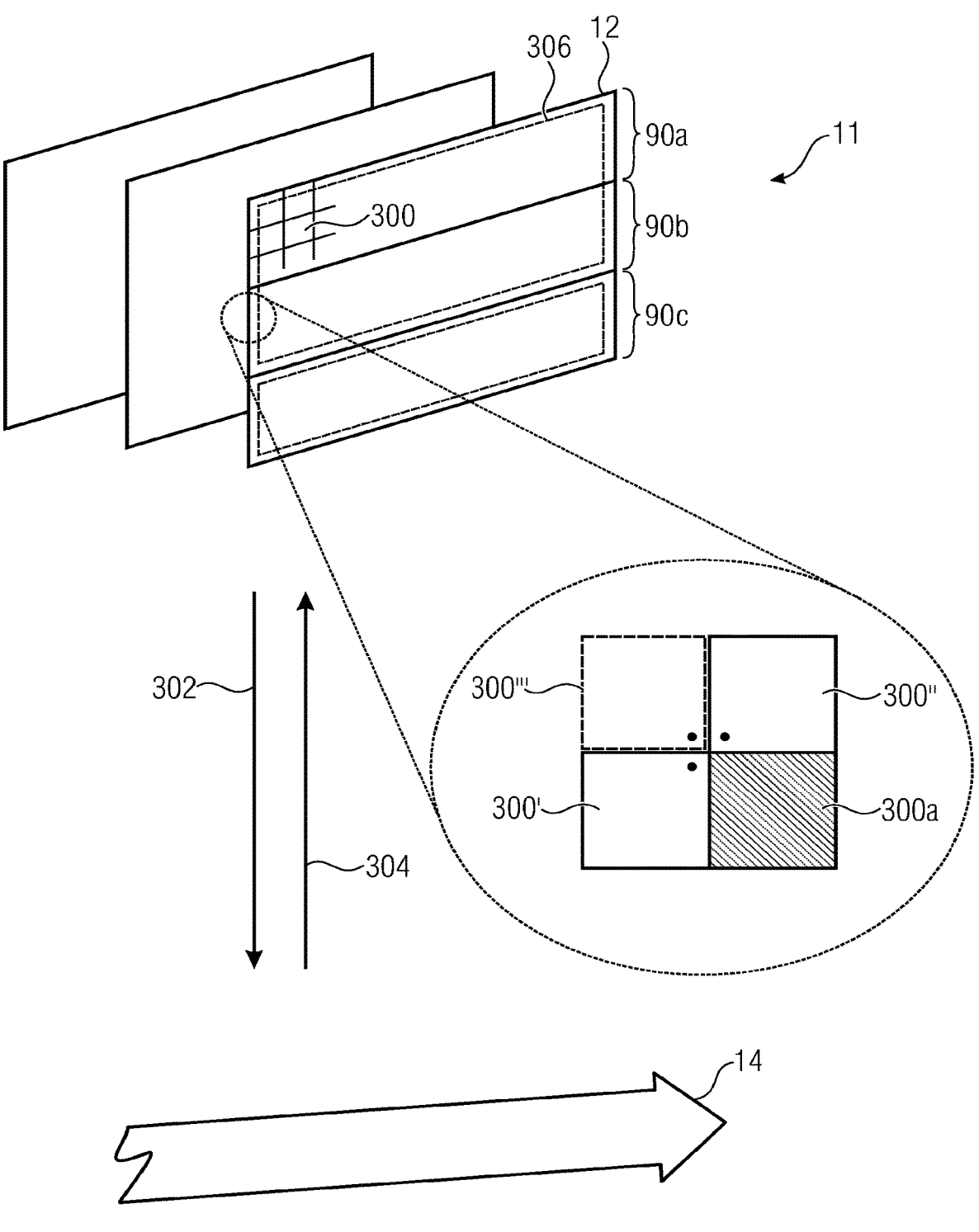
FIG. 13 shows a schematic diagram illustrating a functionality of a video encoder and video decoder in accordance with an embodiment signaling QP variation across a picture in units of blocks using spatial prediction in a manner avoiding any dependency on QPs of blocks farther away from any current block than the immediate neighborhood of the current block; as a fall back predictor for QP of non-available neighboring blocks, as slice QP may be used; although not shown, a third spatial predictor which may be a top-left adjacent neighbor may further be included in the spatial neighborhood.

It has been showed above that an indication of the use or none use of the exclusion of buffered filter parametrization settings of pictures of equal temporal level is applied or not with the decoder having the capability to rely on this sort of promise in order to schedule the processing of the decoding See FIG. 13, which shows the functionality of a video encoder and a video decoder in accordance with an embodiment of the fourth aspect of the present application. FIG. 13 shows a currently coded/decoded picture 12 of video 11 and a subdivision of picture 12 into blocks 300 in units of which the video encoder varies the quantization parameter using which the prediction residual signal for picture 12 is coded into data stream 14. The encoding 302 of picture 12 of video 11 into data stream 14 is not supposed to enable parallel decoding at the decoding side as described above with respect to FIG. 6. The video encoder may be in a sequential mode rather than a parallel mode. That is, the video encoder may alternatively be able to operate as described above with respect to FIG. 6, but FIG. 13 represents a sequential mode. The encoding procedure 302 involves both stages of encoding described above with respect to FIG. 6, i.e., the encoding of picture 12 into video data and the subsequent entropy coding of the video data into data stream 14. The decoding procedure is illustrated in FIG. 13 using arrow 304. In order to transmit the quantization parameter used for the various blocks 300, a spatial prediction concept is used. FIG. 13 highlights a currently processed block for which a QP is transmitted at 300a. A certain neighborhood of block 300a is inspected to locate neighboring blocks 300' and 300" in predetermined relative locational positions relative to block 300a when the number of blocks 300' and 300" is not restricted to be two but may alternatively be merely one or be greater than two. Also, the usage of the left neighboring block 300' and the top neighboring block 300" is illustrative and different neighbor block position could be selected. A third neighboring block to the top left of block 300a, i.e. covering the sample neighboring, to top left, the upper left corner of block 300a, is depicted in FIG. 13 using dotted lines, for instance. On the basis of quantization parameters assigned to these blocks 300' and 300", the QP for block 300a is predicted and a prediction offset or delta QP is transmitted for block 300a in data stream 14. The derivation of the prediction on the basis of blocks 300', 300" and 300''' may be embodied as described above, i.e. using the sum of QP for blocks 300', 300" minus QP for block 300''', clipped to be between the QPs for blocks 300', 300". An alternative would be to simply take the QP of 300' as QP predictor, or to take a median or mean of the QP for blocks 300', 300" as predictor. For each block 300' or 300" not being available since, for instance, its block position is outside the slice 306, the current block 300a is located in or because the respective block position of the respective block 300' or 300" is outside of the current picture 12, its QP is replaced or substituted by a slice QP transmitted in the data stream for slice 306 block 300a is located in. The replacement could also be applied only in case of all participating QPs not being available. For instance, when taking a median or mean of the QP for blocks 300', 300" as QP predictor, then the usage of the slice QP could be used as predictor only in case of both QOs being unavailable, i.e. the QPs of blocks 300' and 300". If only one of the latter is missing or unavailable, the other available QP is used as predictor. When taking the QP for block 300' as QP predictor, then the usage of the slice QP would apply it this QP of block 300' is missing. In even other words, the quantization parameter predictor for block 300a is derived from a quantization parameter of one or more blocks 300'-300''' at one or more block positions having a predetermined relative locational relationship to the predetermined block and the quantization parameter of any block at a block position outside a predetermined region of the current picture which the predetermined block is located in, such as outside the current tile or slice or even outside the picture area, is substituted with a major quantization parameter signaled in the data stream for the predetermined region. In other words, if a certain block whose the quantization parameter is unavailable because, for instance, the block lies outside at a certain picture region to which block 300a belongs, same is substituted with the major quantization parameter signaled in the data stream for the predetermined region such as the slice QP. Or, in case of the QP of one or more of the blocks 300'-300' such as all of them, being unavailable, the major quantization parameter is used as QP predictor directly. FIG. 13, for instance, illustrates a subdivision of picture 12 into two slices 306 indicated by dashed lines. By avoiding the dependency of the predictor for the QP for block 300a on QPs of blocks farther away from current block 300a, i.e., from blocks not immediately neighboring block 300a, it is possible to perform at least the encoding of picture 12 into the intermediate level represented by the coding data 94 depicted in FIG. 6 in parallel for stripes 90a, 90b and 90c picture 12 is partitioned into. In particular, according to the coding order, the stripes 90a to 90c follow each other and using the substitution concept for non-available blocks according to JEM as described above would lead to a sequentializing dependency of the coding of one stripe to a preceding stripe since this concept uses a kind of buffering of most recently encountered QP along coding order which would involve a dragging of a QP value from one stripe to the following stripe. Using the restricted spatial prediction reach or, alternatively speaking, the restricted reach of the prediction sources for predicting the QP of block 300a it is possible for the encoder to start the coding of picture content within one common slice 306 in parallel for stripes 90a and 90b partitioning the slice 306, both along the coding order, here exemplarily from left to right, without having to wait with the coding of any succeeding stripe 90b in coding order until finishing the coding into the coding data with respect to the preceding stripe 90a. Based on the QP for block 300a, encoder and decoder may, in addition to the usage of this quantization parameter for the quantization of the prediction residual signal, set a filter parameterization for an in-loop or post filter such as 250 to 254 shown in FIGS. 3 and 4. Interestingly, the encoder may even perform the filtering or parts of the filtering locally at the position of a currently processed block 300a for any succeeding stripe 90b prior to the completion of the coding data formation which respect to the preceding stripe 90a since the QP value for block 300a is already fixed and ready for transmission in data stream 14. The restrictive term "parts of the filtering" has been used due to spatial reach of filtering. Due to the nature of a deblocking filter, for instance, filtering adjacent blocks that border to the neighboring blocks to right and below cannot be filtered right away. The filtering is postponed to be processed when the adjacent blocks have been processed. The block that is locally filtered is a block that is slightly displaced top-left of the current block.

It should be noted that encoder and decoder might be able to alternatively operate in another mode of differently predicting the QPs, such as according to HEVC using the last visited QP predictor with a signaling being used to select between both modes.

A fifth aspect of the present application pertains to video encoders and video decoders of the types supporting the WPP processing capability of FIG. 6. As described with respect to FIG. 6, the inter-stripe coding/decoding offset to be obeyed in WPP processing between the stripes depends on the spatial intra-picture coding dependency reach. In accordance with the embodiments described next, video encoder and video decoder communicate with each other via a data stream which enables a setting of this reach to one of several states, thereby enabling a weighing-up between higher parallelity and parallel processing at the cost of slightly decreased spatial redundancy exploitation and, accordingly, slightly decreased coding efficiency on the one hand and decreased parallelity at slightly increased coding efficiency owing to a slightly increased spatial redundancy exploitation on the other hand. The following description starts, again, with a presentation of the idea in form of a modification of JEM or HEVC and using a CTU dependency offset signaling as a possibility for measuring the spatial intra-picture coding dependency reach. A generalized embodiment is described thereinafter.

When using Wave-front Parallel Processing (WPP) a minimum CTU-offset of two CTUs that may be used between consecutive CTU-lines is defined by the current state of the art standard [1], to ensure references are available for prediction. With the new emerging standard [3] new tools might be incorporated, where a CTU-offset of two CTU's might not be sufficient anymore and could compromise the new tools.

In the particular embodiment, to generalize the handling of the dependency to upper CTU-line, an explicit signaling of a line-wise applied CTU-dependency-offset parameters is used.

The CTU-dependency-offset to $CTU_{X_{ref},Y_{ref}}$ may be signaled for Intra and Non-Intra-Slices independently. The value of 0 is indicating that the proposed restriction scheme is disabled. If the value is not 0, a CU, PU or TU correspondent to $CTU_{X_{ref},Y_{ref}}$ is available for reference, when the $CTU_{X_{ref},Y_{ref}}$ is available for prediction for the current $CTU_{X_{cur},Y_{cur}}$ when the reference is not restricted, e.g. located in a different slice, tile, or outside the picture and the following condition is true:

In WPP case:

$$(Y_{ref}=Y_{cur} \text{ AND } X_{ref} \leq X_{cur}) \text{ OR}$$

$$(Y_{ref}<Y_{cur} \text{ AND } X_{ref}<((Y_{curr}-Y_{ref})*(CTU\_dependency\_offset\_id-1)+X_{cur}))$$

In sequential processing order case:

$$(Y_{ref}=Y_{cur} \text{ AND } X_{ref} \leq X_{cur}) \text{ OR}$$

$$(Y_{ref}<Y_{cur} \text{ AND } X_{ref}<((Y_{curr}-Y_{ref})*(CTU\_dependency\_offset\_id-1)+X_{cur}+1))$$

where $X_{ref}$, $Y_{ref}$, $X_{cur}$, $Y_{cur}$ are CTU position coordinates.

In FIG. 14 the impact of two different CTU dependencies is illustrated. Both drawings show a snapshot taken after the same virtual encoding time. On the one hand, the increased structural delay in A) is the reason the last CTU line had not been yet started, whereas in B) only few CTUs are left to be processed. On the other hand, two more blocks are available for prediction in A from the above CTU line, and with tools exploiting spatial dependencies of multiple lines the area available for prediction is significantly enlarged.

It should be noted, that large values of CTU-dependency-offset parameter would allow wider region to be used for spatial prediction increasing R-D-gains of tools, but would introduce a longer structural delay when using WPP or parallel reconstruction. Because the spatial prediction of the reconstruction samples from the neighborhood is primarily used in Intra-Slices, whereas Non-Intra-Slices typically use temporal prediction, with a slice-type dependent CTU-dependency offset, the trade-off between structural delay and R-D-performance can easily be adapted to the different needs.

A special operation point can be achieved with CTU_dependency_offset_id equal to 1. In this case the structural delay is completely eliminated for the WPP case. This might be beneficial in low-delay scenarios. It should be stated that the spatial reach parameter in the sequential mode, i.e. not WPP, restricts spatial prediction tools and, thus, can be seen as a complexity vs. quality parameter.

These proposed parameters might be signaled via high-level sets SPS, PPS, etc. or Slice Header. Example is given in FIG. 15.

Figure 16:
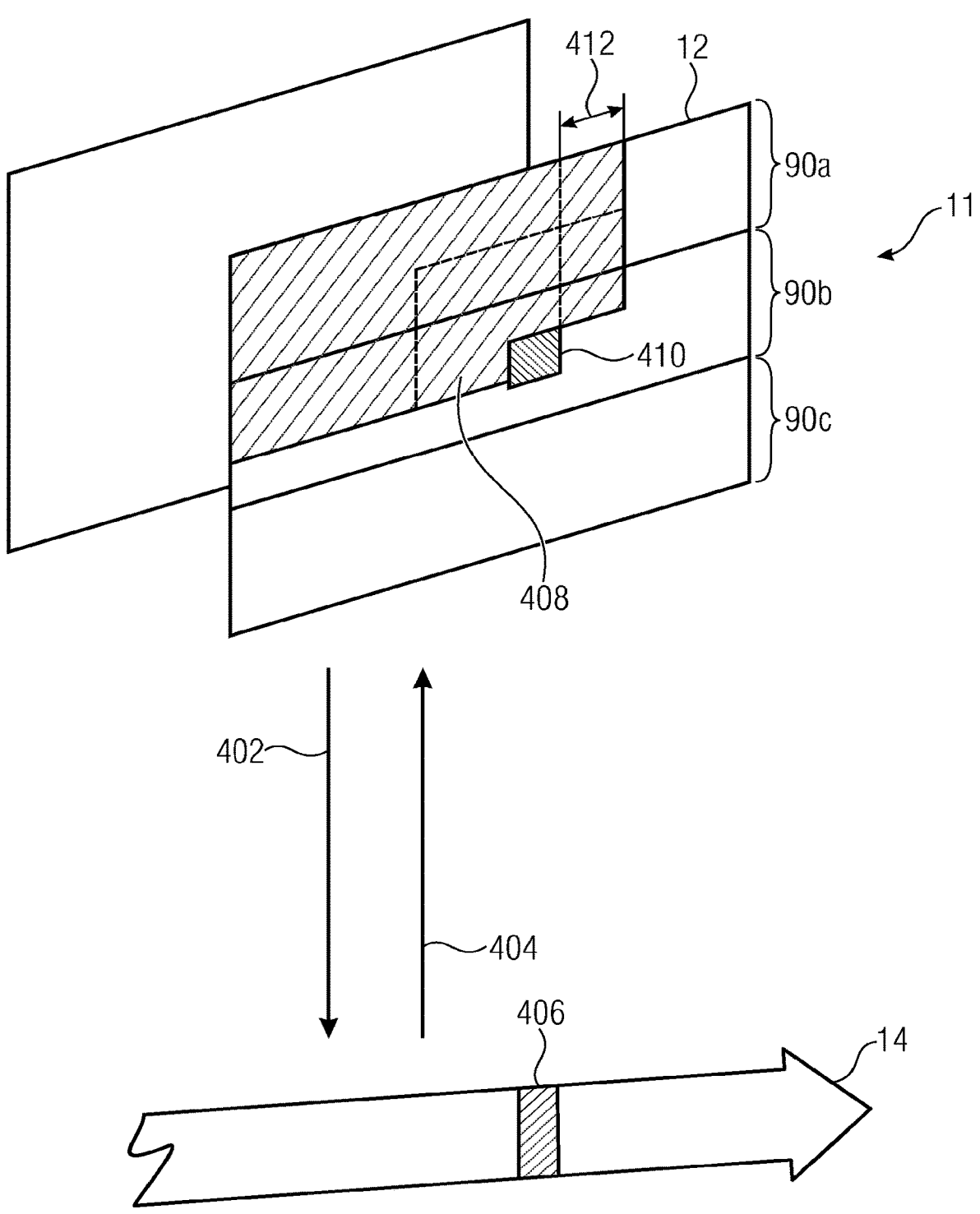
FIG. 16 shows a schematic diagram illustrating the functionality of a video encoder and video decoder offering a signalization of the reach setting in the data stream.

See FIG. 16 with respect to which embodiments of a video encoder and a video decoder are described which support the WPP enabling coding of video 12 into data stream 14. The coding procedure 402 incorporates both coding steps namely 92 and 98 of FIG. 6, and the same applies to the decoding 404 shown in FIG. 16, namely steps 108 and 114. Here, the video codec is designed in a manner so that the data stream 14 conveys a signaling 406 which sets a spatial intra-picture coding dependency reach setting to one of several possible settings. The settings may differ in width or wideness of the spatial intra-picture coding dependency reach. The spatial intra-picture coding dependency reach is depicted in FIG. 6 at 408 and determines a region for a currently processed portion 410 on the basis of which predictions and context derivations or any other spatial redundancy exploitation tasks may be performed for coding block 410. In particular, the spatial intra-picture coding dependency reach settings may differ in amount at which reach 408 extends from the current portion 410 which the reach area 408 relates to, in any preceding stripe 90a preceding in stripe coding order along the coding direction within each stripe, leading here exemplarily from left to right, wherein this amount is depicted in FIG. 16 at 412 using a double headed arrow measuring the length as an offset along the horizontal direction, i.e., the coding order direction within each stripe 90a to 90c. As described above, the offset 412 may increase for portions of reach area 408 in stripes according to their stripe distance to the current stripe the current portion 410 is located in. The reach area 408 may, as illustrated in FIG. 16, be configured to extend from currently coded portion 410 up to the upper left corner of picture 12 inevitably as illustrated in FIG. 16, or may be restricted in its extension towards the top edge and the left-hand edge of picture 12 as illustrated by a dashed line in FIG. 16. The latter restriction may be independent from signaling 406 or may also depend thereon. The variation of the reach settings impacts the parallelity at which encoding and decoding 402 and 404 may be performed as it has been explained with respect to FIG. 14 wherein, however, a lower parallelity is compensated by an increase in coding efficiency owing to an increased possibility of exploiting spatial redundancies, and vice versa. As explained above with respect to FIG. 14, the different settings signaled by signalization 406 may be indicated by a parameter directly indicating a minimum inter-stripe coding/decoding offset to be obeyed in WPP processing, i.e., in parallel processing stripes 90a to 90c. It should be noted that in accordance with the embodiment explained with respect to FIG. 16, the video codec may also be applicable for video encoders or video decoders which merely operate in accordance with one or a subset of the signalable spatial intra-picture coding dependency reach settings offered by signalization 406. For instance, the encoder may be fixed to operate according to one of the settings and it signals this setting in data stream 14. The decoder may likewise be able to operate or support all settings signalable by signalization 406 or merely one or a subset thereof with notifying the user of inability of decoding the received data stream 14 in case of the signaled setting of signalization 406 being one of not supported settings.

While FIG. 16 showed that the spatial reach 408 within the current picture 12 from which the coding of the currently coded block 410 or a coding parameter relating to currently coded block 410 by means of the spatial intra-picture coding dependency depends, may overlay one preceding, in stripe coding order, stripe, here 90a, of the current picture, it should be noted that the reach may also overlay more than one previous stripe. Further, for each of the plurality of spatial intra-picture coding reach settings, the distance at which spatial reach reaches out toward the coding forward direction may increase with increasing inter-stripe distance, i.e. may be monotonically increasing with increasing distance of the stripe containing block 410 relative to the stripe where distance 412 is measured. Comparing two settings, these distances 412 are, for all previous stripes, either larger than for one of the two settings compared to the other or vice versa. Further, as described, the selected spatial intra-picture coding reach setting may be signaled for purely intra-predictively coded portions of the video such as I slices and inter-predictively coded portions such as P and B slices, separately, as it has been described above. The spatial reach may, as described, be related to prediction dependencies, and/or context derivation dependencies. The variation may impact a predictor search reach such as a search reach for searching patches for intra prediction, or a size of a prediction parameter value domain and accordingly the code rate of certain prediction parameters and the parsing thereof may change.

Additionally or alternatively, a video encoder and a video decoder may operate without the signalization capability, but fixedly in a manner so that the reach setting is different for slices merely offering intra-prediction modes, i.e., purely intra-predicted, and slices offering both, intra-prediction modes and inter-prediction modes. In particular, the reach 408 is wider for I slices, thereby lowering the parallelity capability, but significantly increasing the coding efficiency for these slices as these slices are inevitably restricted to the use of intra-prediction as inter-prediction is not available for these slices. The major part of the video 11 is, however, composed of slices also offering inter-prediction modes such as P and B slices and for the latter, the parallelity is increased at a merely minor impact on coding efficiency as the intra-prediction mode does not play a significant role for these slices anyway. With respect to remaining details, reference is made to the previous description.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] ISO/IEC, ITU-T. High efficiency video coding. ITU-T Recommendation H.265|ISO/IEC 23008 10 (HEVC), edition 1, 2013; edition 2, 2014.

[2] JEM reference software, https://jvet.hhi.fraunhofer.de/svn/svn_HMJEMSoftware/.

[3] J. Chen, E. Alshina, G. J. Sullivan, J.-R. Ohm, J. Boyce. Algorithm description of Joint Exploration Test Model 7 (JEM7), JVET, doc. JVET-G1001, August 2017.

[4] "JVET group," [Online]. Available: http://phenix.it-sud-paris.eu/jvet/.

The invention claimed is:

1. A video encoder configured to encode a slice of a current picture into a data stream by partitioning the slice into rows of Coding Tree Units (CTUs);

select a CTU dependency offset for the slice out of a plurality of CTU dependency offsets, the CTU dependency offset indicating a minimum CTU offset between consecutive CTU rows to be obeyed by a decoder when decoding CTU rows in parallel, wherein the CTU dependency offset is selected based on a slice type of the slice; and signal the CTU dependency offset in the data stream.

2. The video encoder of claim 1, wherein the CTU dependency offset determines, for a CTU of the slice, a region on a basis of which predictions and context derivations are performed.

3. The video encoder of claim 1, wherein the slice type is I and the CTU dependency offset is signaled in a sequence parameter set (SPS) and is specific to slices with slice type I within a corresponding sequence of the SPS.

4. The video encoder of claim 1, wherein the slice type is I and the CTU dependency offset is signaled in a picture parameter set (PPS) and is specific to slices with slice type I within a corresponding picture of the PPS.

5. The video encoder of claim 1, wherein the slice type is one of P or B and the CTU dependency offset is signaled in a sequence parameter set (SPS) and is specific to slices with slice type P or B within a corresponding sequence of the SPS.

6. The video encoder of claim 1, wherein the slice type is one of P or B and the CTU dependency offset is signaled in a picture parameter set (PPS) and is specific to slices with slice type P or B within a corresponding picture of the PPS.

7. The video encoder of claim 1, wherein the video encoder signals an intra CTU dependency offset specific to slices of type I and an inter CTU dependency offset specific to slices of type P or B in at least one of a PPS or SPS.

8. A video decoder configured to determine a slice type for a slice from a data stream, the slice partitioned into rows of Coding Tree Units (CTUs);

decode a CTU dependency offset specific to the slice type from the data stream, the CTU dependency offset indicating a minimum CTU offset between consecutive CTU rows to be obeyed when decoding CTU rows in parallel;

decode a first CTU row of the slice; and decode a second CTU row of the slice in parallel with the first CTU row, the second CTU row consecutive with the first CTU row, and offset a start of decoding the second CTU row relative to a start of decoding the first CTU row based on the CTU dependency offset decoded.

9. The video decoder of claim 8, wherein the determined slice type is I and the CTU dependency offset is decoded from a sequence parameter set (SPS) and is specific to slices with slice type I within a corresponding sequence of the SPS.

10. The video decoder of claim 8, wherein the determined slice type is I and the CTU dependency offset is decoded from a picture parameter set (PPS) and is specific to slices with slice type I within a corresponding picture of the PPS.

11. The video decoder of claim 8, wherein the determined slice type is one of P or B and the CTU dependency offset is decoded from a sequence parameter set (SPS) and is specific to slices with slice type P or B within a corresponding sequence of the SPS.

12. The video decoder of claim 8, wherein the determined slice type is one of P or B and the CTU dependency offset is decoded from a picture parameter set (PPS) and is specific to slices with slice type P or B within a corresponding picture of the PPS.

13. The video decoder of claim 8, wherein the video decoder decodes an intra CTU dependency offset specific to slices of type I and an inter CTU dependency offset specific to slices of type P or B from at least one of a PPS or SPS.

14. A method of video encoding, the method comprising encoding a slice of a current picture into a data stream by partitioning the slice into rows of Coding Tree Units (CTUs);

selecting a CTU dependency offset for the slice out of a plurality of CTU dependency offsets, the CTU dependency offset indicating a minimum CTU offset between consecutive CTU rows to be obeyed by a decoder when decoding CTU rows in parallel, wherein the CTU dependency offset is selected based on a slice type of the slice; and signaling the CTU dependency offset in the data stream.

15. A method of video decoding, the method comprising determining a slice type for a slice from a data stream, the slice partitioned into rows of Coding Tree Units (CTUs);

decoding a CTU dependency offset specific to the slice type from the data stream, the CTU dependency offset indicating a minimum CTU offset between consecutive CTU rows to be obeyed when decoding CTU rows in parallel;

decoding a first CTU row of the slice; and decoding a second CTU row of the slice in parallel with the first CTU row, the second CTU row consecutive with the first CTU row, and offset a start of decoding the second CTU row relative to a start of decoding the first CTU row based on the CTU dependency offset decoded.

16. The method of claim 15, wherein the determined slice type is I and the CTU dependency offset is decoded from a sequence parameter set (SPS) and is specific to slices with slice type I within a corresponding sequence of the SPS.

17. The method of claim 15, wherein the determined slice type is I and the CTU dependency offset is decoded from a picture parameter set (PPS) and is specific to slices with slice type I within a corresponding picture of the PPS.

18. The method of claim 15, wherein the determined slice type is one of P or B and the CTU dependency offset is decoded from a sequence parameter set (SPS) and is specific to slices with slice type P or B within a corresponding sequence of the SPS.

19. The method of claim 15, wherein the determined slice type is one of P or B and the CTU dependency offset is decoded from a picture parameter set (PPS) and is specific to slices with slice type P or B within a corresponding picture of the PPS.

20. The method of claim 15, further comprising decoding an intra CTU dependency offset specific to slices of type I and an inter CTU dependency offset specific to slices of type P or B from at least one of a PPS or SPS.

\* \* \* \* \*